US009382978B2

(12) United States Patent
Ogauchi et al.

(10) Patent No.: US 9,382,978 B2
(45) Date of Patent: Jul. 5, 2016

(54) AUTOMATIC TRANSMISSION

(71) Applicant: MAZDA MOTOR CORPORATION, Hiroshima (JP)

(72) Inventors: Yasuhiro Ogauchi, Higashihiroshima (JP); Shinya Kamada, Kure (JP); Tatsuhiko Iwasaki, Hiroshima (JP); Masaru Nakagishi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/431,148

(22) PCT Filed: Oct. 3, 2014

(86) PCT No.: PCT/JP2014/005047
§ 371 (c)(1),
(2) Date: Mar. 25, 2015

(87) PCT Pub. No.: WO2015/064014
PCT Pub. Date: May 7, 2015

(65) Prior Publication Data
US 2016/0033012 A1    Feb. 4, 2016

(30) Foreign Application Priority Data

Oct. 28, 2013    (JP) .................................. 2013-223551

(51) Int. Cl.
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| 2008/0182705 | A1 | 7/2008 | Hart et al. | |
| 2008/0269004 | A1* | 10/2008 | Diosi | F16H 3/66 475/276 |
| 2009/0209384 | A1* | 8/2009 | Carey | B60K 17/04 475/205 |
| 2010/0197442 | A1 | 8/2010 | Hart et al. | |
| 2010/0197443 | A1 | 8/2010 | Hart et al. | |
| 2010/0279811 | A1* | 11/2010 | Portell | F16H 3/66 475/116 |

(Continued)

FOREIGN PATENT DOCUMENTS

| JP | H01-131051 U | 9/1989 |
| JP | H06-14103 Y2 | 4/1994 |

(Continued)

*Primary Examiner* — Erin D Bishop
(74) *Attorney, Agent, or Firm* — Studebaker & Brackett PC

(57) ABSTRACT

An automatic transmission (10) includes in a transmission case (11), an input (an input shaft 12), an output (an output shaft 13), first to fourth planetary gear sets (PG1, PG2, PG3, and PG4) of a single pinion type, first to third clutches (CL1-CL3) engaging and disengaging predetermined rotating elements of the first to fourth planetary gear sets, a first brake (BR1) engaging and disengaging a third ring gear (R3) with and from the transmission case, and a second brake (BR2) engaging and disengaging a first sun gear (S1) and a fourth sun gear (S4) with and from the transmission case. The input, the output, the planetary gear sets, the clutches, and the brakes are arranged coaxially with each other. The first, second, third, and fourth planetary gear sets are arranged in this order from one axial end to the other axial end of the automatic transmission.

6 Claims, 19 Drawing Sheets

(56) References Cited

U.S. PATENT DOCUMENTS

| | | |
|---|---|---|
| 2011/0183808 A1 | 7/2011 | Hart et al. |
| 2012/0202637 A1 | 8/2012 | Carey et al. |
| 2013/0157797 A1* | 6/2013 | Diemer .................... F16H 3/66 475/276 |

FOREIGN PATENT DOCUMENTS

| | | |
|---|---|---|
| JP | 4644700 B2 | 12/2010 |
| JP | 2011-149522 A | 8/2011 |

* cited by examiner

FIG.2

|  | CL1 | CL2 | CL3 | BR1 | BR2 |
|---|---|---|---|---|---|
| FIRST GEAR | ○ |  |  | ○ | ○ |
| SECOND GEAR |  | ○ |  | ○ | ○ |
| THIRD GEAR | ○ | ○ |  | ○ |  |
| FOURTH GEAR |  | ○ | ○ | ○ |  |
| FIFTH GEAR | ○ |  | ○ | ○ |  |
| SIXTH GEAR | ○ | ○ | ○ |  |  |
| SEVENTH GEAR | ○ |  | ○ |  | ○ |
| EIGHTH GEAR |  | ○ | ○ |  | ○ |
| REVERSE GEAR |  |  | ○ | ○ | ○ |

<FIRST GEAR>

<FIRST GEAR>

○——○ NORMALLY ENGAGED
×------× ENGAGED BY CLUTCH
■ FIXED BY BRAKE
● INPUT/OUTPUT ROTATION

<SECOND GEAR>

<SECOND GEAR>

○——○ NORMALLY ENGAGED
×------× ENGAGED BY CLUTCH
■ FIXED BY BRAKE
● INPUT/OUTPUT ROTATION

<THIRD GEAR>

<THIRD GEAR>

<FOURTH GEAR>

<FOURTH GEAR>

○——○ NORMALLY ENGAGED
×------× ENGAGED BY CLUTCH
■ FIXED BY BRAKE
● INPUT/OUTPUT ROTATION

<FIFTH GEAR>

<FIFTH GEAR>

○——○ NORMALLY ENGAGED
×------× ENGAGED BY CLUTCH
■ FIXED BY BRAKE
● INPUT/OUTPUT ROTATION

<SIXTH GEAR>

<SIXTH GEAR>

○——○ NORMALLY ENGAGED
×------× ENGAGED BY CLUTCH
■ FIXED BY BRAKE
● INPUT/OUTPUT ROTATION

<SEVENTH GEAR>

<SEVENTH GEAR>

<EIGHTH GEAR>

<EIGHTH GEAR>

○——○ NORMALLY ENGAGED
×······× ENGAGED BY CLUTCH
■ FIXED BY BRAKE
● INPUT/OUTPUT ROTATION

<REVERSE GEAR>

<REVERSE GEAR>

○——○ NORMALLY ENGAGED
×------× ENGAGED BY CLUTCH
■ FIXED BY BRAKE
● INPUT/OUTPUT ROTATION

FIG.12

|  | SUN GEAR | RING GEAR | PINION |
|---|---|---|---|
| PG1 | 58 | 108 | 25 |
| PG2 | 52 | 86 | 17 |
| PG3 | 42 | 108 | 31 |
| PG4 | 40 | 108 | 34 |

FIG.13

|  | GEAR RATIO | GEAR STEP |
|---|---|---|
| FIRST GEAR | 4.894 |  |
|  |  | 1.537 |
| SECOND GEAR | 3.184 |  |
|  |  | 1.511 |
| THIRD GEAR | 2.107 |  |
|  |  | 1.255 |
| FOURTH GEAR | 1.679 |  |
|  |  | 1.301 |
| FIFTH GEAR | 1.290 |  |
|  |  | 1.290 |
| SIXTH GEAR | 1.000 |  |
|  |  | 1.202 |
| SEVENTH GEAR | 0.832 |  |
|  |  | 1.278 |
| EIGHTH GEAR | 0.651 |  |
| REVERSE GEAR | −3.540 |  |

AUTOMATIC TRANSMISSION

TECHNICAL FIELD

The present invention relates to an automatic transmission mounted in a vehicle.

BACKGROUND ART

In general, an automatic transmission mounted in a vehicle includes a plurality of planetary gear sets (planetary gear mechanisms), and a plurality of hydraulic frictional coupling elements such as clutches and brakes. These frictional coupling elements are selectively engaged by hydraulic control to change power transmission paths through the planetary gear sets, thereby providing a plurality of forward gears and usually one reverse gear.

In recent years, there is a growing demand for an increase in the number of forward gears to improve the fuel efficiency of an engine and transmission performance. For example, an automatic transmission suggested includes three planetary gear sets and six frictional coupling elements, and provides eight forward gears by combining two of these frictional coupling elements.

In an automatic transmission with this configuration, however, four of the frictional coupling elements are disengaged in each gear stage. The sliding friction between the friction plates of the disengaged frictional coupling elements or the viscous resistance of the lubricant between the friction plates or any other factor increases the drive loss of the automatic transmission as a whole. This may hinder an improvement in the fuel efficiency, which is the advantage in increasing the number of gears.

To overcome such a problem, PATENT DOCUMENT 1 discloses an automatic transmission including four planetary gear sets, and five frictional coupling elements. Three of the frictional coupling elements are selectively engaged to provide eight forward gears.

In this configuration, the number of the frictional coupling elements that are disengaged in each gear stage decreases to two, thereby reducing the above-described drive loss. All the four planetary gear sets are of a single pinion type, which have a simpler configuration than planetary gear sets of a double pinion type, thereby reducing the whole size of the transmission.

The automatic transmission disclosed in PATENT DOCUMENT 1 has the configuration shown in FIG. 20. Specifically, first, second, third, and fourth planetary gear sets PGa, PGb, PGc, and PGd are arranged in this order from the input side (the left of FIG. 20). A first clutch CLa is arranged between the second and third planetary gear sets PGb and PGc. A second clutch CLb and a third clutch CLc are arranged closer to on an outer periphery and an inner periphery, respectively, between the third and fourth planetary gear sets PGc and PGd. A carrier of the first planetary gear set PGa and a ring gear of the fourth planetary gear set PGd are engaged via a power transmission member x. A ring gear of the second planetary gear set PGb and a sun gear of the third planetary gear set PGc are engaged via a power transmission member y. A carrier of the third planetary gear set PGc and a carrier of the fourth planetary gear set PGd are engaged via a power transmission member z.

With this configuration, the power transmission members x and y cover the outer periphery of the first clutch CLa, and the power transmission members x and z cover the outer peripheries of the second and third clutches CLb and CLc. As a result, each of the clutches CLa, CLb, and CLc is located in a closed space surrounded by the planetary gear sets on the both sides of the clutch, and the power transmission members on the outer periphery of the clutch.

CITATION LIST

Patent Document

[PATENT DOCUMENT 1] Japanese Patent No. 4644700

SUMMARY OF THE INVENTION

Technical Problem

According to the configuration disclosed in PATENT DOCUMENT 1, each clutch is located in such a closed space, and thus an oil path for supplying hydraulic oil to the clutch is not simply guided from a tubular wall or end wall of the transmission case to the clutch. The hydraulic oil needs to be supplied to each clutch via an oil path passing through the inside of a planetary gear set, for example, an oil path provided for a shaft member or a sleeve member, which penetrates the inside of a planetary gear set.

Thus, the hydraulic oil supply path from the transmission case to each clutch becomes too long and complicated. This results in an increase in the size of the automatic transmission, and causes a decrease in response in speed control made by supplying and discharging hydraulic oil. In addition, this configuration requires more portions of an oil path, which communicate with each other among a plurality of relatively rotating members. This may increase the amount of hydraulic oil leaking from a seal mechanism for the communicating portions. An increase in the size of a pump for compensating for the leakage increases the size of an automatic transmission. The leakage decreases the response in the speed control.

The present invention was made in view of the problems. It is an objective of the present invention to address the above-described problems caused by an increase in the number of gear stages of an automatic transmission by providing an automatic transmission with a new configuration, which simplifies the hydraulic oil supply path from a transmission case to each clutch.

Solution to the Problem

In order to achieve the objective, the present invention provides an automatic transmission mounted in a vehicle. The automatic transmission includes, in a transmission case, an input engaged with a power source; an output; a first planetary gear set being of a single pinion type, and including a first sun gear, a first carrier, and a first ring gear; a second planetary gear set being of the single pinion type, and including a second sun gear, a second carrier, and a second ring gear; a third planetary gear set being of the single pinion type, and including a third sun gear, a third carrier, and a third ring gear; a fourth planetary gear set being of the single pinion type, and including a fourth sun gear, a fourth carrier, and a fourth ring gear; a first clutch; a second clutch; a third clutch; a first brake; and a second brake. The input, the output, the planetary gear sets, the clutches, and the brakes are arranged coaxially with each other. The first, second, third, and fourth planetary gear sets are arranged in this order from one axial end to the other axial end of the automatic transmission. The input and the first carrier are normally engaged. The first sun gear and the fourth sun gear are normally engaged. The first ring gear and the second sun gear are normally engaged. The second carrier and the fourth carrier are normally engaged. The third carrier and the fourth ring gear are normally engaged. The output, the second carrier, and the fourth carrier are normally engaged. The first clutch engages and disengages the input and the first carrier with and from the third sun gear. The second clutch engages and disengages the first ring gear and the second sun gear with and from the third sun gear. The third clutch engages and disengages the second ring gear with and from the third sun gear. The first brake engages and disengages the third ring gear with and from the transmission case. The second brake engages and disengages the first sun gear and the fourth sun gear with and from the transmission case.

According to this configuration, the first, second, and third clutches engage/disengage the components of the first or/and second planetary gear set(s) with and from the third sun gear. These three clutches are thus arranged in the transmission case closer to the outer periphery than the first and second planetary gear sets are, that is, in a region near a wall of the transmission case. The clutches are not covered with any planetary gear set or any power transmission member. As a result, the hydraulic oil supply path can be guided from the transmission case to each clutch to extend inside in the radial direction without passing through the inside of any planetary gear set.

Thus, the hydraulic oil supply path leading from the transmission case to each of the first, second, and third clutches is shorter and simpler than that in a conventional automatic transmission, in which each clutch is arranged in a closed space surrounded with planetary gear sets and power transmission members. This reduces an increase in the size of the automatic transmission due to an increase in the number of gear stages, and a decrease in response in speed control made by supplying and discharging hydraulic oil.

This configuration requires fewer portions of an oil path, which communicate with each other among a plurality of relatively rotating members, thereby reducing the amount of hydraulic oil leaking from the communicating portions. This results in reduction in an increase in the size of the transmission due to an increase in the size of a pump for compensating for the leakage, and a decrease in response in speed control due to the leakage.

In the above-described automatic transmission, each of the first, second, and third clutches preferably includes an inner rotating member and an outer rotating member engaged with and disengaged from each other in response to supply and discharge of hydraulic oil. The outer rotating members of the first, second, and third clutches are preferably integrated into a common outer rotating member shared by the first, second, and third clutches. An end of the common outer rotating member at the other axial end is preferably normally engaged with the third sun gear. The inner rotating member of the first clutch is preferably normally engaged with the input and the first carrier. The inner rotating member of the second clutch is preferably normally engaged with the first ring gear and the second sun gear. The inner rotating member of the third clutch is preferably normally engaged with the second ring gear.

According to such an embodiment, each of the first, second, and third clutches is arranged in the transmission case in a non-closed state without being surrounded with any planetary gear set or any power transmission member to be closer to the outer periphery than the first and second planetary gear sets are. As a result, the hydraulic oil supply path can be guided from the transmission case to each clutch to extend inside in the radial direction, without passing through the inside of any planetary gear set.

If such a common outer rotating member is provided, the transmission case may include a tubular wall, of which an axial center extends along an axis of the automatic transmission. An outer peripheral surface of the common outer rotating member may directly face an inner peripheral surface of the tubular wall of the transmission case. A hydraulic oil supply path may lead from the transmission case to each of the first, second, and third clutches through a gap between the inner peripheral surface of the tubular wall and the outer peripheral surface of the common outer rotating member.

In the case where such a common outer rotating member is provided, the transmission case may include a case-side cylindrical portion extending from an end wall of the transmission case at the one axial end toward the other axial end. The common outer rotating member may include a rotating member-side cylindrical portion provided at one end of the common outer rotating member at the one axial end and externally fitted in the case-side cylindrical portion. A hydraulic oil supply path leads from the transmission case to each of the first, second, and third clutches through a gap between an outer peripheral surface of the case-side cylindrical portion and an inner peripheral surface of the rotating member-side cylindrical portion.

These configurations provide a concrete means for shortening and simplifying the hydraulic oil supply paths to the first, second, and third clutches.

If such a common outer rotating member is provided, a hydraulic oil supply path may lead from the transmission case to each of the first, second, and third clutches to introduce the hydraulic oil through an oil path provided for the common outer rotating member to a hydraulic chamber of the clutch from a point closer to an inner periphery than the hydraulic chamber is.

According to such an embodiment, when hydraulic oil is supplied to the first, second, and third clutches, the centrifugal force acting on the hydraulic oil assists and accelerates the supply of the hydraulic oil to the hydraulic chamber. This results in faster response in speed control.

The above-described automatic transmission preferably provides eight forward gears and one reverse gear. The first clutch, the first brake, and the second brake are preferably engaged to provide a first gear. The second clutch, the first brake, and the second brake are preferably engaged to provide a second gear. The first clutch, the second clutch, and the first brake are preferably engaged to provide a third gear. The second clutch, the third clutch, and the first brake are preferably engaged to provide a fourth gear. The first clutch, the third clutch, and the first brake are preferably engaged to provide a fifth gear. The first clutch, the second clutch, and the third clutch are preferably engaged to provide the sixth gear. A gear ratio of the automatic transmission is preferably 1 in the sixth gear. The first clutch, the third clutch, and the second brake are preferably engaged to provide a seventh gear. The second clutch, the third clutch, and the second brake are preferably engaged to provide an eighth gear. The third clutch, the first brake, and the second brake are preferably engaged to provide a reverse gear.

According to such an embodiment, speed is properly controlled by proper engagements of the frictional coupling elements in the automatic transmission providing eight forward gears and one reverse gear and having the simplified hydraulic oil supply path. In each gear stage, the number of disengaged ones of the five frictional coupling elements, which have a greater rotational resistance than engaged ones, is smaller than the number of the engaged ones. As a result, efficient power transmission is achieved.

Advantages of the Invention

As can be seen from the foregoing description, in the automatic transmission according to the present invention, each of the first, second, and third clutches is arranged in the transmission case to be closer to the outer periphery than the first and second planetary gear sets are (i.e., in a region near the wall of the transmission case). This simplifies a hydraulic oil supply path from the transmission case to each clutch, thereby reducing an increase in the size of the automatic transmission, and a decrease in response in speed control.

BRIEF DESCRIPTION OF THE DRAWINGS

FIG. 2 is a logic table showing engagements of frictional coupling elements in gear stages of the automatic transmission.

FIG. 12 is a table showing example numbers of teeth of gears forming planetary gear sets.

FIG. 13 is a table showing gear ratios in gear stages and gear steps between successive gears, where the gears have the example numbers of teeth shown in FIG. 12.

DESCRIPTION OF EMBODIMENTS

Embodiments of the present invention will now be described with reference to the drawings.

Figure 1:
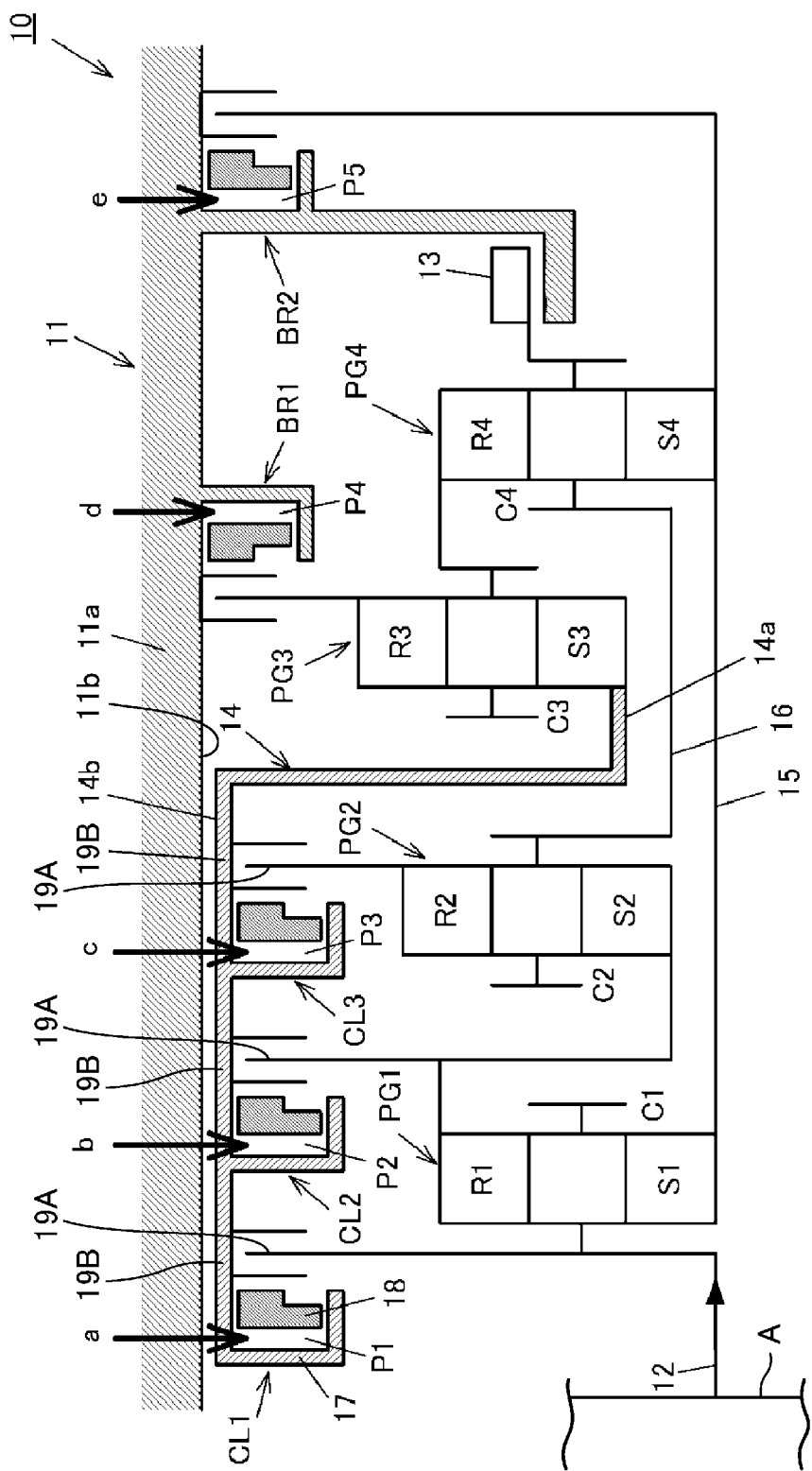
FIG. 1 is a skeleton diagram illustrating an automatic transmission according to a first embodiment of the present invention.

FIG. 1 illustrates a configuration of an automatic transmission 10 according to a first embodiment of the present invention. This automatic transmission 10 is mounted in a vehicle, and provides eight forward gears and one reverse gear.

The automatic transmission 10 includes an input shaft (input) 12 and an output gear (output) 13 in a transmission case 11. The input shaft 12 is arranged at one axial end of the automatic transmission 10 (on the left of FIG. 1) so as to extend axially along the automatic transmission 10, and is engaged with a power source A (e.g., an engine, an electric motor, etc.). The output gear 13 is arranged, at the other axial end of the automatic transmission 10 (on the right of FIG. 1), coaxially with the input shaft 12, and engaged with a differential mechanism. The automatic transmission 10 is a transverse transmission mounted in a vehicle such that the axial direction of the automatic transmission 10 (the horizontal direction of FIG. 1) corresponds to the width direction of the vehicle (i.e., such that the axial center of the automatic transmission 10 extends along the width of the vehicle). The axial center of the automatic transmission 10 agrees with the axial center of the input shaft 12. Hereinafter, the axial direction of the automatic transmission 10 will be hereinafter referred to as a "transmission axis direction." The direction perpendicular to the transmission axis direction will be hereinafter referred to as a "transmission radial direction."

The transmission case 11 further includes a first planetary gear set PG1 (hereinafter simply referred to as a first gear set PG1), a second planetary gear set PG2 (hereinafter simply referred to as a second gear set PG2), a third planetary gear set PG3 (hereinafter simply referred to as a third gear set PG3), and a fourth planetary gear set PG4 (hereinafter simply referred to as a fourth gear set PG4), which are arranged in this order from the one axial end of the transmission axis direction (hereinafter referred to as a power source side) between the input shaft 12 and the output gear 13 in the transmission axis direction. The gear sets are arranged coaxially with the input shaft 12.

In addition, a first clutch CL1, a second clutch CL2, and a third clutch CL3 are arranged in this order from the power source side outside of the first and second gear sets PG1 and PG2 in the transmission radial direction in the transmission case 11 (i.e., so as to be closer to the outer periphery than the first and second gear sets PG1 and PG2 are). The clutches are arranged coaxially with the input shaft 12. A first brake BR1 is arranged coaxially with the input shaft 12 to be closer to the outer periphery than the third gear set PG3 is in the transmission case 11. A second brake BR2 is arranged coaxially with the input shaft 12 at the other axial end of the transmission (hereinafter referred to as a non-power source side) and outside of the output gear 13 in the transmission case 11.

All the first to fourth gear sets PG1-PG4 are of a single pinion type. The first gear set PG1 includes, as rotating elements, a first sun gear S1, a first ring gear R1, and a first carrier C1. The second gear set PG2 includes, as rotating elements, a second sun gear S2, a second ring gear R2, and a second carrier C2. The third gear set PG3 includes, as rotating elements, a third sun gear S3, a third ring gear R3, and a third carrier C3. The fourth gear set PG4 includes, as rotating elements, a fourth sun gear S4, a fourth ring gear R4, and a fourth carrier C4. Each of the first to fourth gear sets PG1-PG4 of the single pinion type further includes a plurality of pinions, which are engaged with the sun gear and the ring gear. Those pinions are supported by the carriers.

The transmission case 11 includes a tubular wall 11a, of which the axial center extends in the transmission axis direction. This tubular wall 11a covers the outer peripheries of the input shaft 12, the output gear 13, the first to fourth gear sets PG1-PG4, the first to third clutches CL1-CL3, and the first and second brakes BR1 and BR2. In this embodiment, the axial center of the tubular wall 11a agrees with the axial center of the automatic transmission 10.

In the automatic transmission 10, the input shaft 12 and the first carrier C1 are normally engaged, the first sun gear S1 and the fourth sun gear S4 are normally engaged, the first ring gear R1 and the second sun gear S2 are normally engaged, the second carrier C2 and the fourth carrier C4 are normally engaged, the third carrier C3 and the fourth ring gear R4 are normally engaged, and the output gear 13, the second carrier C2, and the fourth carrier C4 are normally engaged.

The first clutch CL1 engages and disengages the input shaft 12 and the first carrier C1 with and from the third sun gear S3. The second clutch CL2 engages and disengages the first ring gear R1 and the second sun gear S2 with and from the third sun gear S3. The third clutch CL3 engages and disengages the second ring gear R2 with and from the third sun gear S3.

The first brake BR1 engages and disengages the transmission case 11 with and from the third ring gear R3. The second brake BR2 engages and disengages the transmission case 11 with and from the first and fourth sun gears S1 and S4.

Each of the first to third clutches CL1-CL3 includes an inner rotating member 19A and an outer rotating member 19B, which are engaged with and disengaged from each other via a friction plate in response to supply and discharge of hydraulic oil. The outer rotating members 19B of the first, second, and third clutches are integrated into a common outer rotating member 14 shared by the first, second, and third clutches. An end 14a of this common outer rotating member 14 at the non-power source side is normally engaged with the third sun gear S3.

The inner rotating members 19A of the first to third clutches CL1-CL3 are joined to the input shaft 12 and the rotating elements of the first and second gear sets PG1 and PG2, which are arranged inside the clutches CL1-CL3 in the transmission radial direction (i.e., located closer to the inner periphery than the clutches CL1-CL3 are). The power transmission members, which engage the rotating elements of the first and second gear sets PG1 and PG2 with the rotating elements of the third and fourth gear sets PG3 and PG4, are a first power transmission member 15 and a second power transmission member 16 only. The first power transmission member 15 engages the first sun gear S1 with the fourth sun gear S4. The second power transmission member 16 engages the second carrier C2 with the fourth carrier C4. These first and second power transmission members 15 and 16 may pass inside of the third sun gear S3, which is coupled to the end 14a of the common outer rotating member 14 at the non-power source side.

The first to third clutches CL1-CL3 are thus housed in the transmission case 11 in a non-closed state without being surrounded with any planetary gear set or any power transmission member. The common outer rotating member 14 is placed such that the outer peripheral surface 14b directly faces the inner peripheral surface 11b of the tubular wall 11a. That is to say, no member such as a power transmission member is interposed between the outer peripheral surface 14b of the common outer rotating member 14 and the inner peripheral surface 11b of the tubular wall 11a.

Inside of the common outer rotating member 14, hydraulic chambers P1-P3 of the first to third clutches CL1-CL3 are arranged in the transmission axis direction to be closer to the inner periphery than the common outer rotating member 14 is. Each of the hydraulic chambers P1-P3 is defined by a cylinder 17, and a piston 18 slidably fitted in the cylinder 17 in the transmission axis direction. The hydraulic chambers P1-P3 communicate with the hydraulic oil supply paths a, b, and c for supplying hydraulic oil from the transmission case 11 to the hydraulic chambers P1-P3, respectively. Each of the hydraulic oil supply paths a, b, and c leads from the tubular wall 11a of the transmission case 11 to the associated one of the hydraulic chambers P1-P3 of the clutches CL1-CL3 through the gap between the inner peripheral surface 11b of the tubular wall 11a and the outer peripheral surface 14b of the common outer rotating member 14 (i.e., between the opposed surfaces of the tubular wall 11a and the common outer rotating member 14). That is, each of the hydraulic oil supply paths a, b, and c is formed by connecting two oil paths through a gap. One oil path is provided for the tubular wall 11a of the transmission case 11. The other oil path extends along the common outer rotating member 14 in the transmission radial direction to communicate with the associated one of the hydraulic chambers P1-P3 at a point closer to the inner peripheral surface. The gap is located between the inner peripheral surface 11b of the tubular wall 11a and the outer peripheral surface 14b of the common outer rotating member 14, and is sealed with a sealing member provided therebetween.

Meanwhile, hydraulic chambers P4 and P5 of the first and second brakes BR1 and BR2, each of which has the same configuration as the hydraulic chambers P1-P3, are provided in the transmission case 11. Thus, hydraulic oil supply paths d and e provided in the transmission case 11 supply hydraulic oil to the hydraulic chambers P4 and P5, respectively.

The output gear 13 is gear-engaged to the input gear of the differential mechanism via a gear on a counter shaft, which extends parallel to the input shaft 12.

With the above-described configuration, the automatic transmission 10 according to this embodiment selectively engages three of the five frictional coupling elements as shown in an engagement logic table of FIG. 2 by controlling supply and discharge of hydraulic oil to and from the hydraulic chamber P1-P5 to provide first to eighth forward gears and a reverse gear. In the engagement logic table of FIG. 2, circled cells represent engagements of the frictional coupling elements, and blank cells represent disengagements of the frictional coupling elements.

Next, a mechanism for determining the gear ratio of the automatic transmission 10 in each gear stage will be described based on the combination of the frictional coupling elements shown in FIG. 2.

Figure 3A:
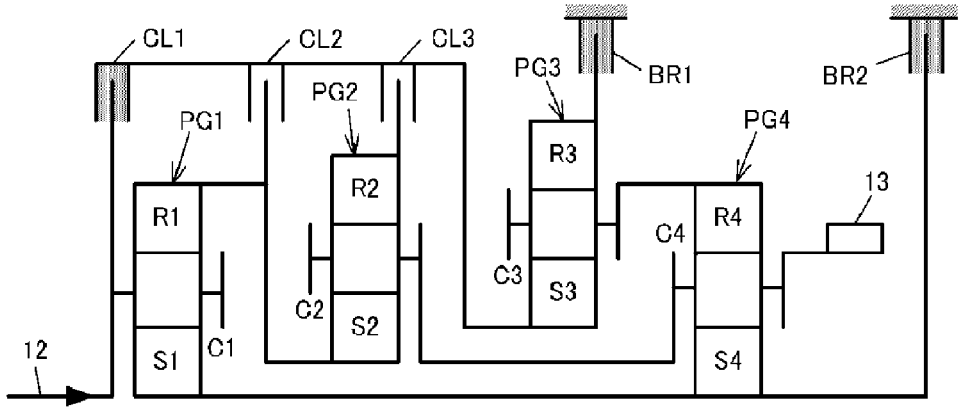
FIG. 3A is a skeleton diagram illustrating the engagement of the frictional coupling elements in a first gear.
Figure 4A:
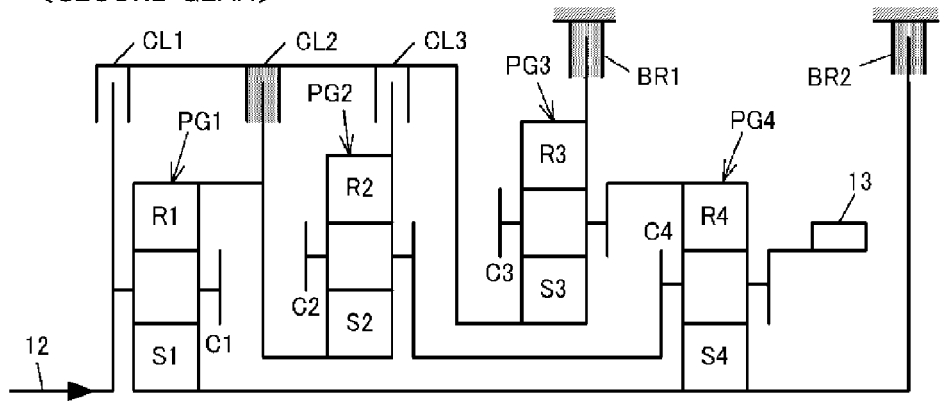
FIG. 4A is a skeleton diagram illustrating the engagement of the frictional coupling elements in a second gear.

FIGS. 3A, 4A, . . . , 11A are skeleton diagrams, each of which illustrates the engagement of the frictional coupling elements in a gear stage, and corresponds to FIG. 1. In each figure, the power source A, the transmission case 11, the hydraulic chambers P1-P5, etc., are not shown. In each skeleton diagram, the engaged frictional coupling elements are shaded.

Figure 3B:
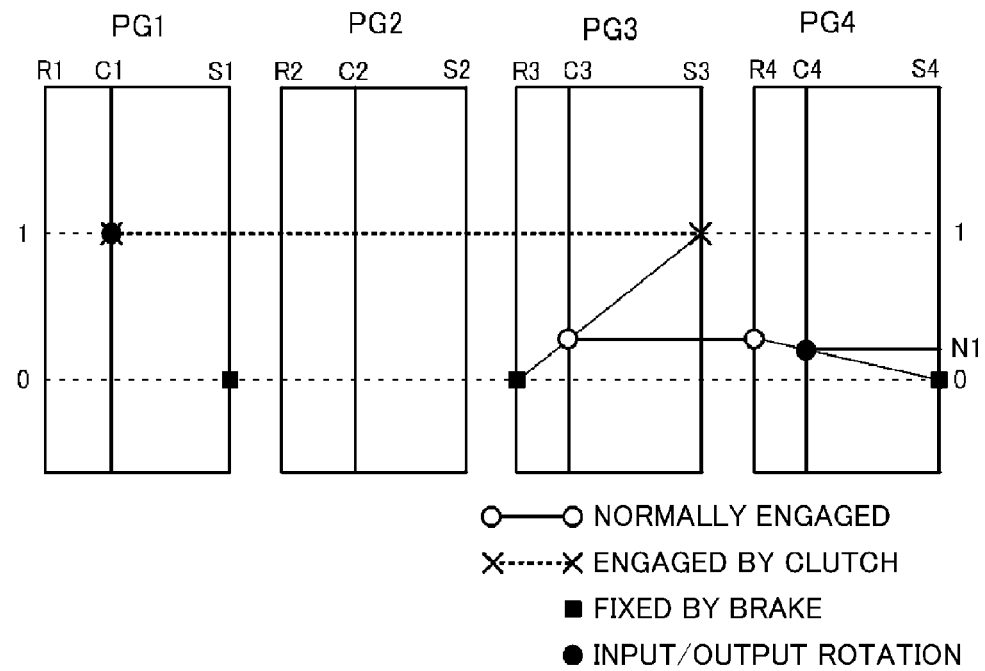
FIG. 3B is a gear ratio diagram of the first gear.
Figure 4B:
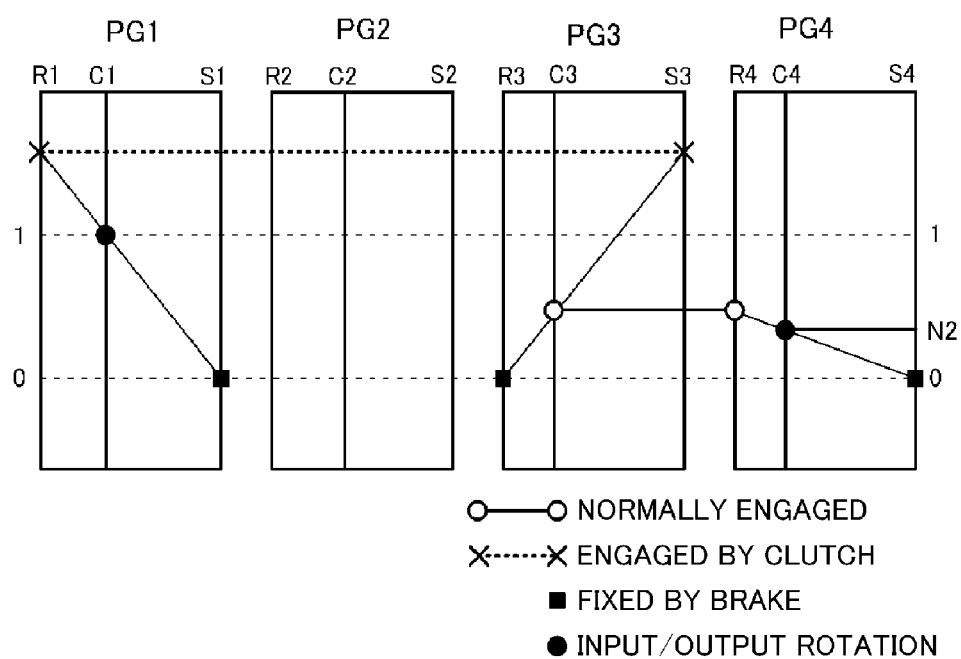
FIG. 4B is a gear ratio diagram of the second gear.

FIGS. 3B, 4B, . . . , 11B are gear ratio diagrams in the gear stages, and correspond to FIGS. 3A, 4A, . . . , 11A, respectively. In each gear ratio diagram, the lateral distance between each pair of the rotating elements of the gear sets PG1-PG4 is determined by the gear ratio.

In each gear ratio diagram, the ordinate represents a rotational speed. The input rotational speed, that is, the rotational speed of the input shaft 12 and the first carrier C1, which is normally engaged with the input shaft 12, is 1. The rotational speed of the rotating elements fixed by the brakes is 0. The rotational speeds of the normally engaged rotating elements are equal. The rotational speeds of the rotating elements engaged by the clutches are equal. N1-N8 and Nr denote output rotational speeds in the gear stages, that is, the rotational speed of the second and fourth carriers C2 and C4 (the rotational speed of the output gear 13). Since the input rotational speed is 1, the reciprocal number of this output rotational speed is the gear ratio of the automatic transmission 10 in the gear stage.

In the first gear, as shown in FIGS. 3A and 3B, the first clutch CL1, the first brake BR1, and the second brake BR2 are engaged. Thus, the input shaft 12 is engaged with the third sun gear S3 so that the rotational speed of the third sun gear S3 is 1, and the rotational speed of the third ring gear R3 is 0. Accordingly, the rotational speed of the third carrier C3, and the fourth ring gear R4, which is normally engaged with the third carrier C3, is determined. The rotational speed of the fourth carrier C4 is determined based on this rotational speed of the fourth ring gear R4 and on the presupposition that the rotational speed of the fourth sun gear S4 is 0. The determined rotational speed is an output rotational speed N1 in the first gear.

In the second gear, as shown in FIGS. 4A and 4B, the second clutch CL2, the first brake BR1 and the second brake BR2 are engaged. Thus, the rotational speed of the first carrier C1 normally engaged with the input shaft 12 is 1, and the rotational speed of the first sun gear S1 is 0. Accordingly, the rotational speed of the first ring gear R1, and the third sun gear S3, which is engaged with the first ring gear R1, is determined. Since the rotational speed of the third ring gear R3 is 0, the rotational speed of the third carrier C3 and the fourth ring gear R4, which is normally engaged with the third carrier C3, is determined. Furthermore, since the rotational speed of the fourth sun gear S4 is 0, the rotational speed of the fourth carrier C4 is determined. The determined rotational speed is an output rotational speed N2 in the second gear.

Figure 5A:
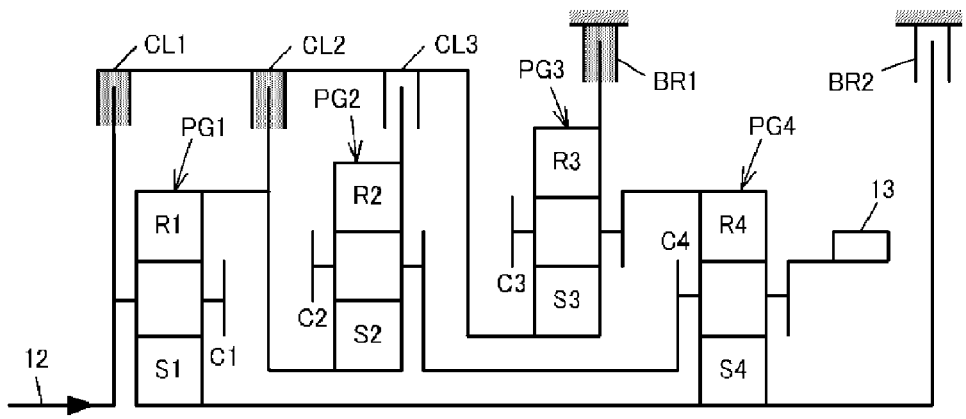
FIG. 5A is a skeleton diagram illustrating the engagement of the frictional coupling elements in a third gear.
Figure 5B:
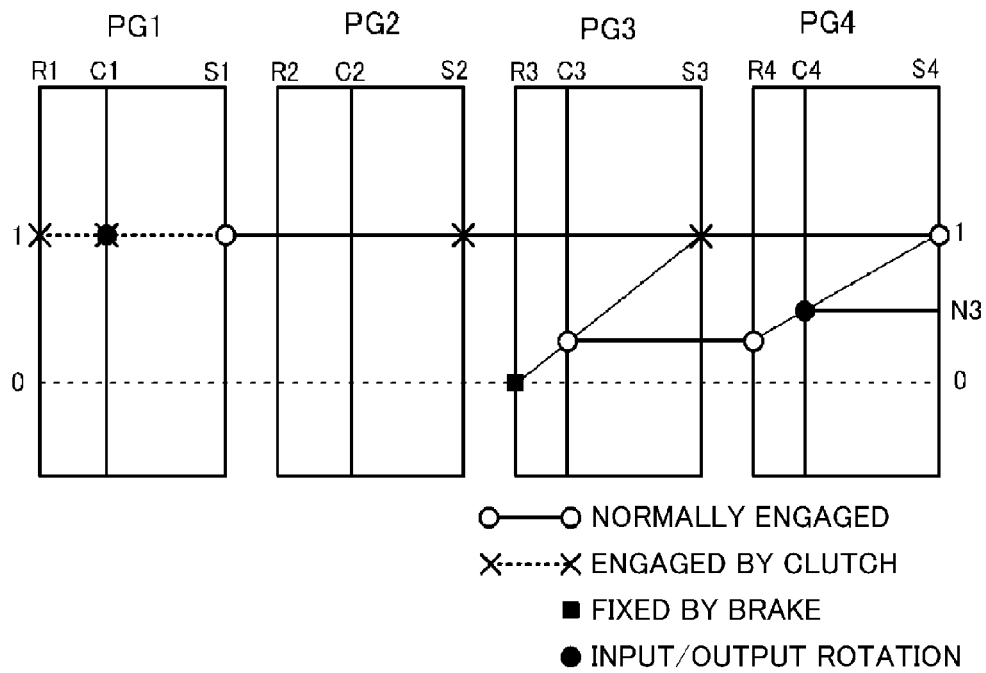
FIG. 5B is a gear ratio diagram of the third gear.

In the third gear, as shown in FIGS. 5A and 5B, the first clutch CL1, the second clutch CL2 and the first brake BR1 are engaged. Thus, the input shaft 12 is are engaged with the first carrier C1 and the first ring gear R1 to rotate together, thereby integrally rotating the whole first gear set PG1 at the rotational speed of 1. The rotational speed of the third sun gear S3, which is engaged with the first ring gear R1, and the fourth sun gear S4, which is normally engaged with the first sun gear S1, is also 1.

Since the rotational speed of the third ring gear R3 is 0, the rotational speed of the third carrier C3, and the fourth ring gear R4, which is normally engaged with the third carrier C3 is determined. Furthermore, since the rotational speed of the fourth sun gear S4 is 1, the rotational speed of the fourth carrier C4 is determined. The determined rotational speed is an output rotational speed N3 in the third gear.

Figure 6A:
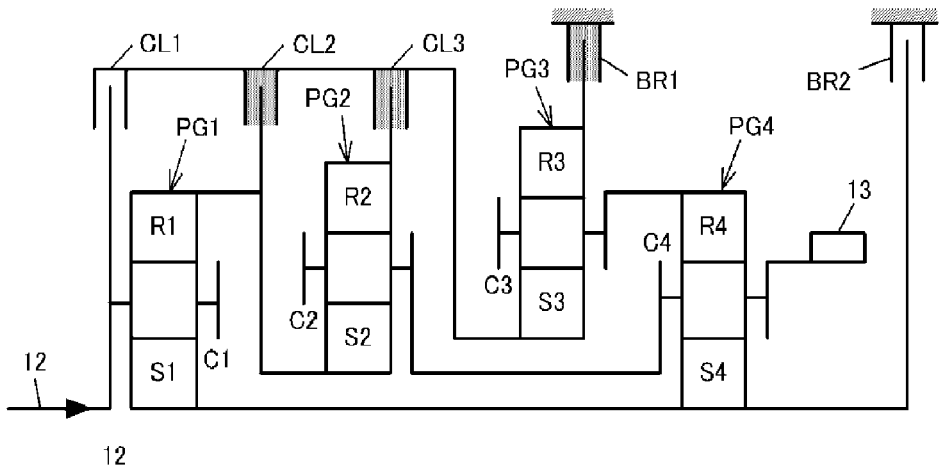
FIG. 6A is a skeleton diagram illustrating the engagement of the frictional coupling elements in a fourth gear.
Figure 6B:
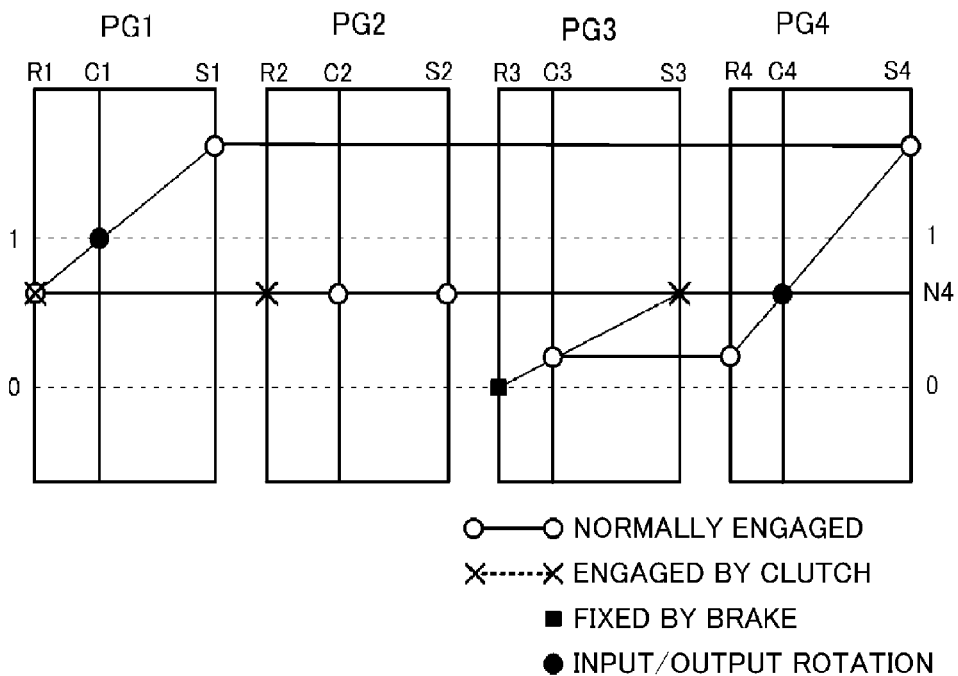
FIG. 6B is a gear ratio diagram of the fourth gear.

In the fourth gear, as shown in FIGS. 6A and 6B, the second clutch CL2, the third clutch CL3 and the first brake BR1 are engaged. Thus, the second sun gear S2 and the second ring gear R2 rotate together to integrally rotate the whole second gear set PG2. The first ring gear R1, which is normally engaged with the second sun gear S2, the fourth carrier C4, which is normally engaged with the second carrier C2, and the third sun gear S3, which is engaged with the second ring gear R2, rotate together with the whole second gear set PG2.

The rotational speed of the rotating elements, which rotate together, is determined on the above-described presuppositions and the following presuppositions; the rotational speed of the first carrier C1 is 1; the rotational speed of the third ring gear R3 is 0; the first sun gear S1 and the fourth sun gear S4 are normally engaged, the third carrier C3 and the fourth ring gear R4 are normally engaged. The determined rotational speed is an output rotational speed N4 in the fourth gear.

Figure 7A:
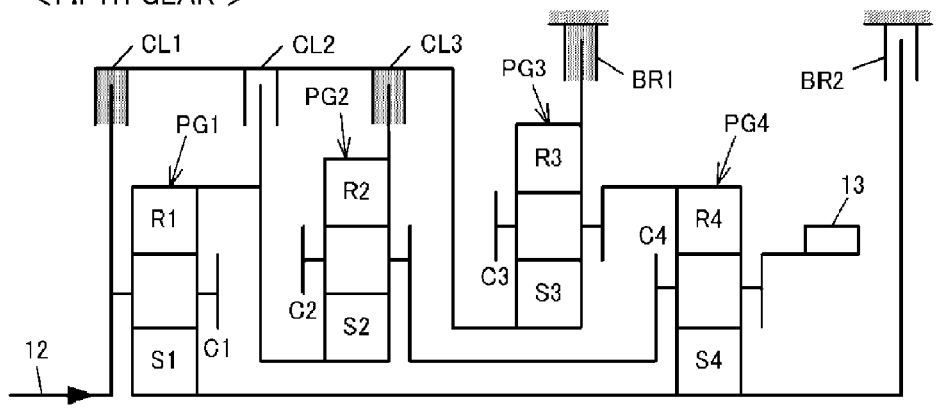
FIG. 7A is a skeleton diagram illustrating the engagement of the frictional coupling elements in a fifth gear.
Figure 7B:
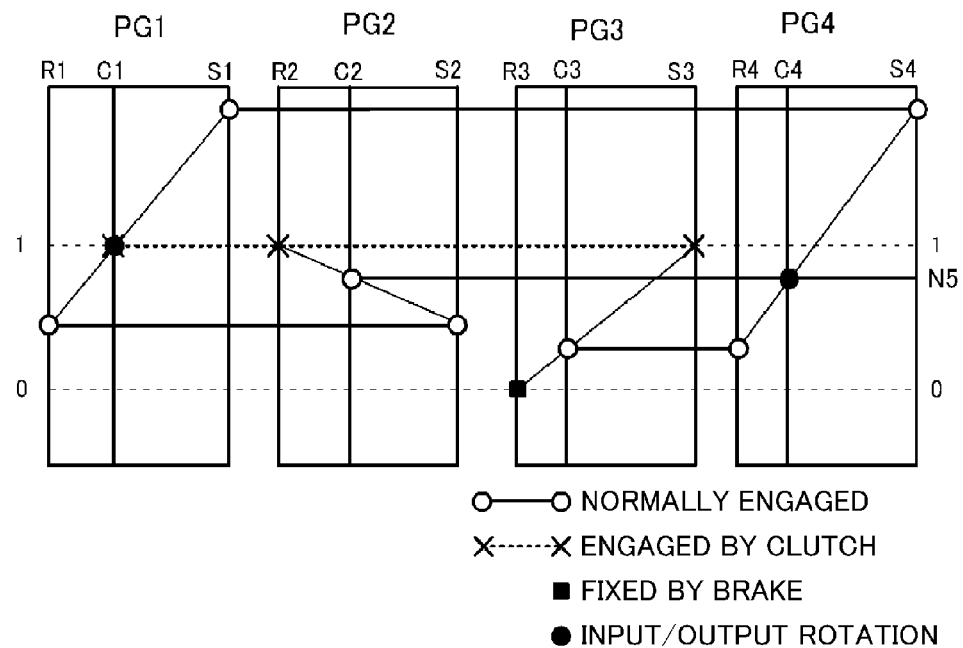
FIG. 7B is a gear ratio diagram of the fifth gear.

In the fifth gear, as shown in FIGS. 7A and 7B, the first clutch CL1, the third clutch CL3 and the first brake BR1 are engaged. Thus, the first carrier C1, which is normally engaged with the input shaft 12, the second ring gear R2, and the third sun gear S3 are engaged. The rotational speed of these elements is 1. Since the rotational speed of the third ring gear R3 is 0, the rotational speed of the third carrier C3 and the fourth ring gear R4, which is normally engaged with the third carrier C3, is determined.

Since the first sun gear S1 and the fourth sun gear S4 are normally engaged, the first ring gear R1 and the second sun gear S2 are normally engaged, and the second carrier C2 and the fourth carrier C4 are normally engaged, the rotational speed of the fourth carrier C4 is determined. The determined rotational speed is an output rotational speed N5 in the fifth gear.

Figure 8A:
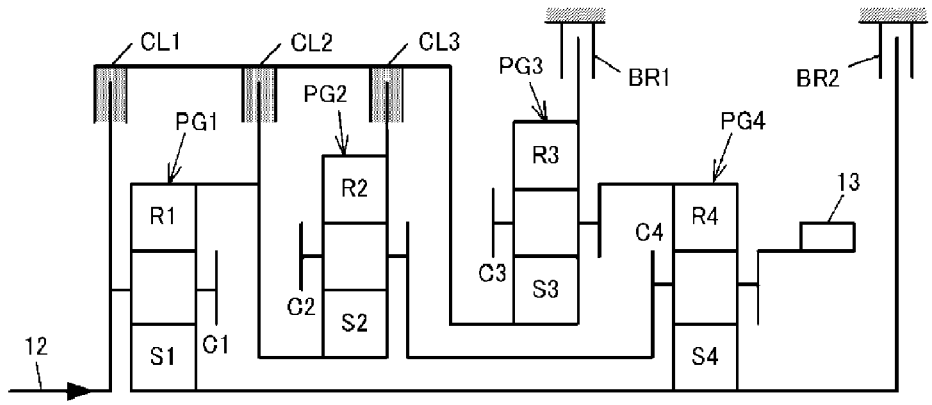
FIG. 8A is a skeleton diagram illustrating the engagement of the frictional coupling elements in a sixth gear.
Figure 8B:
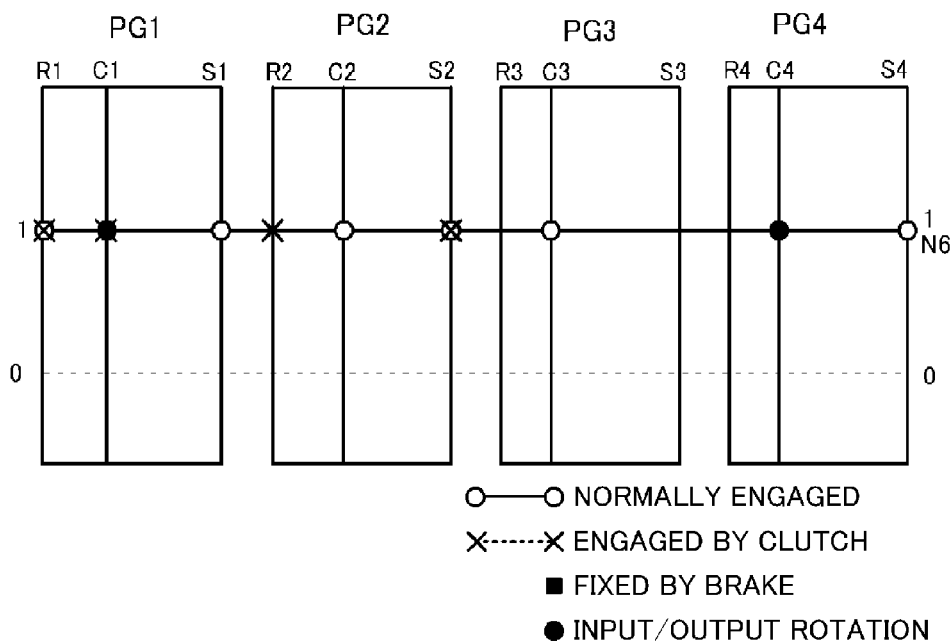
FIG. 8B is a gear ratio diagram of the sixth gear.

In the sixth gear, as shown in FIGS. 8A and 8B, the first clutch CL1, the second clutch CL2 and the third clutch CL3 are engaged. Thus, the first carrier C1, which is normally engaged with the input shaft 12, and the first ring gear R1 rotate together to integrally rotate the whole first gear set PG1 at the rotational speed of 1. Since the first ring gear R1 and the second sun gear S2 are normally engaged, and the second sun gear S2 and the second ring gear R2 rotate together, the second gear set PG2 as a whole rotates together at the rotational speed of 1.

This rotational speed of 1 is output, as an output rotational speed N6 in the sixth gear, from the second carrier C2 via the fourth carrier C4. The direct drive (i.e., the gear ratio is 1) is thus provided in the sixth gear.

Figure 9A:
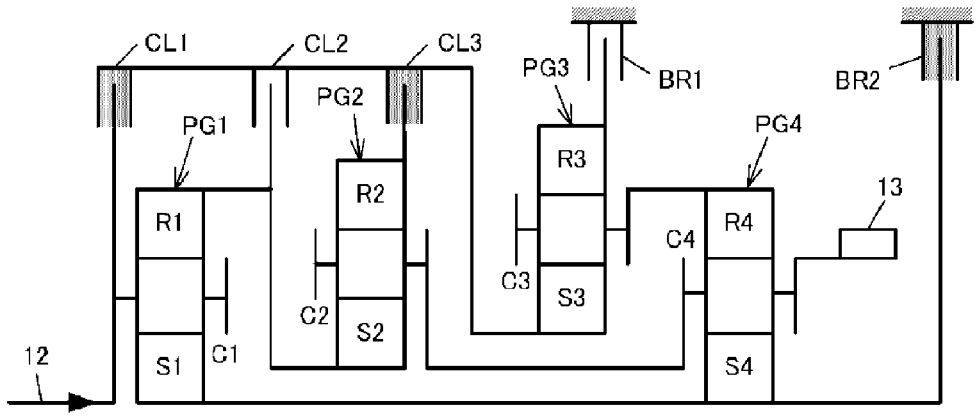
FIG. 9A is a skeleton diagram illustrating the engagement of the frictional coupling elements in a seventh gear.
Figure 9B:
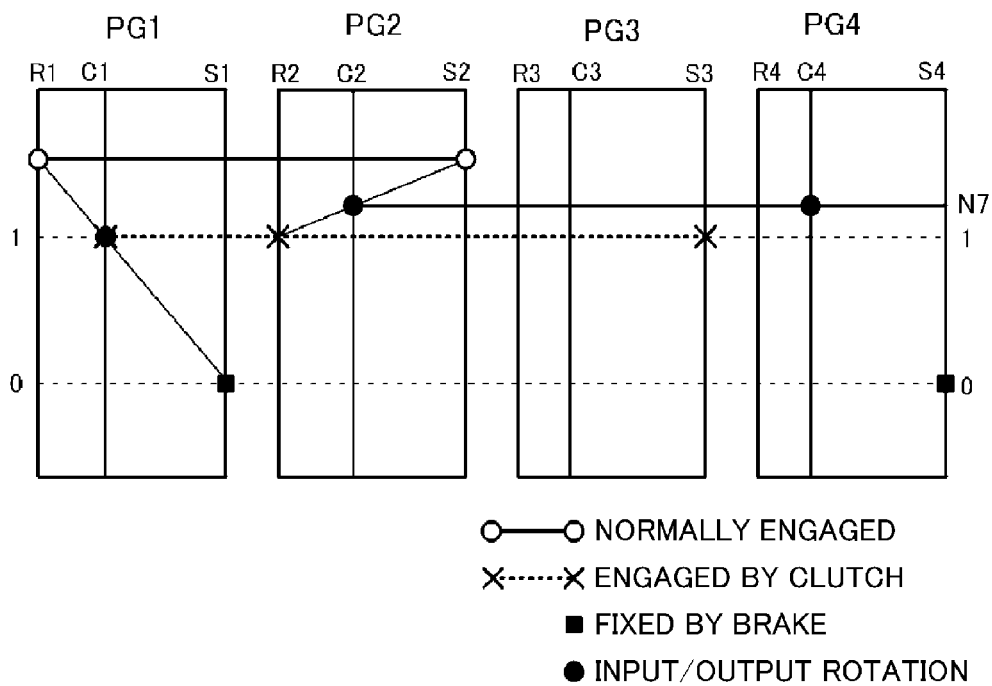
FIG. 9B is a gear ratio diagram of the seventh gear.

In the seventh gear, as shown in FIGS. 9A and 9B, the first clutch CL1, the third clutch CL3 and the second brake BR2 are engaged. Thus, the rotational speed of the first sun gear S1 is 0, and the rotational speed of the first carrier C1, which is normally engaged with the input shaft 12, is 1. Accordingly, the rotational speed of the first ring gear R1, and the second sun gear S2, which is normally engaged with the first ring gear R1, is determined. Since the rotational speed of the second ring gear R2, which is engaged with the first carrier C1, is 1, the rotational speed of the second carrier C2 is determined. The determined rotational speed is output, as an output rotational speed N7 in the seventh gear, via the fourth carrier C4.

Figure 10A:
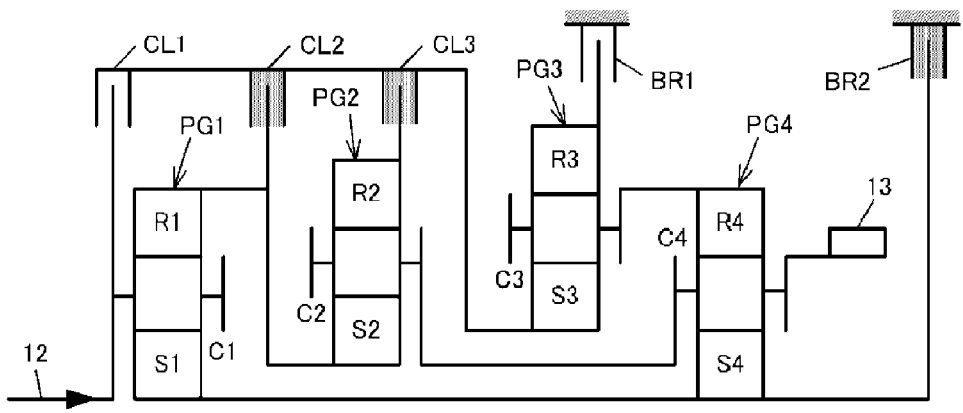
FIG. 10A is a skeleton diagram illustrating the engagement of the frictional coupling elements in an eighth gear.
Figure 10B:
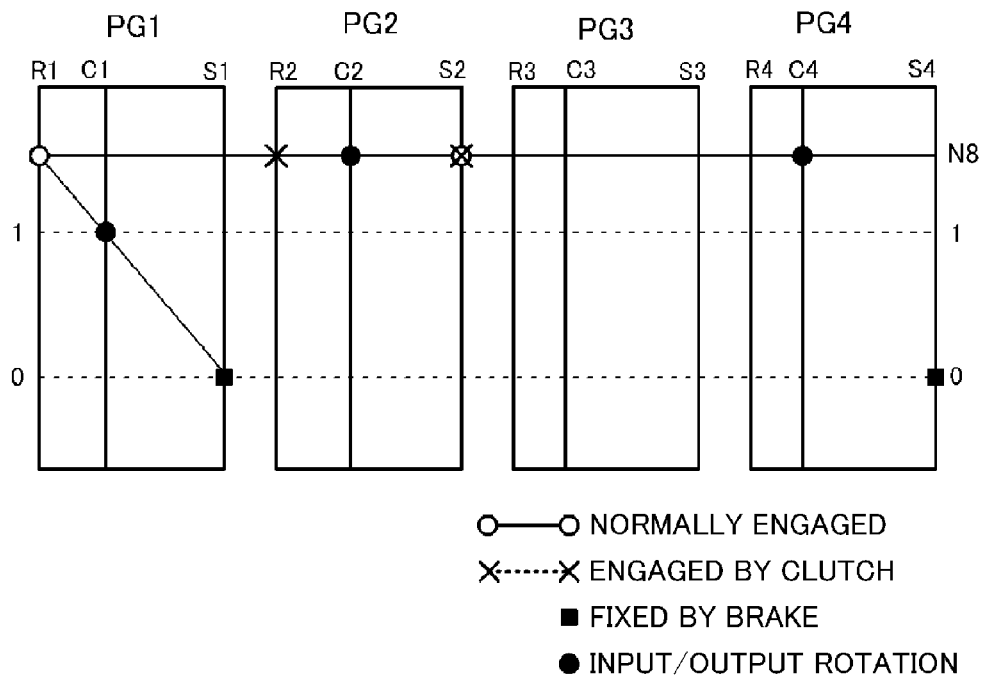
FIG. 10B is a gear ratio diagram of the eighth gear.

In the eighth gear, as shown in FIGS. 10A and 10B, the second clutch CL2, the third clutch CL3 and the second brake BR2 are engaged. Thus, the rotational speed of the first sun gear S1 is 0, and the rotational speed of the first carrier C1, which is normally engaged with the input shaft 12, is 1. Accordingly, the rotational speed of the first ring gear R1, and the second sun gear S2, which is normally engaged with the first ring gear R1, is determined.

The second sun gear S2 and the second ring gear R2 are engaged to integrally rotate the whole second gear set PG2. The speed of the rotation is output, as an output rotational speed N8 in the eighth gear, from the second carrier C2 via the fourth carrier C4.

Figure 11A:
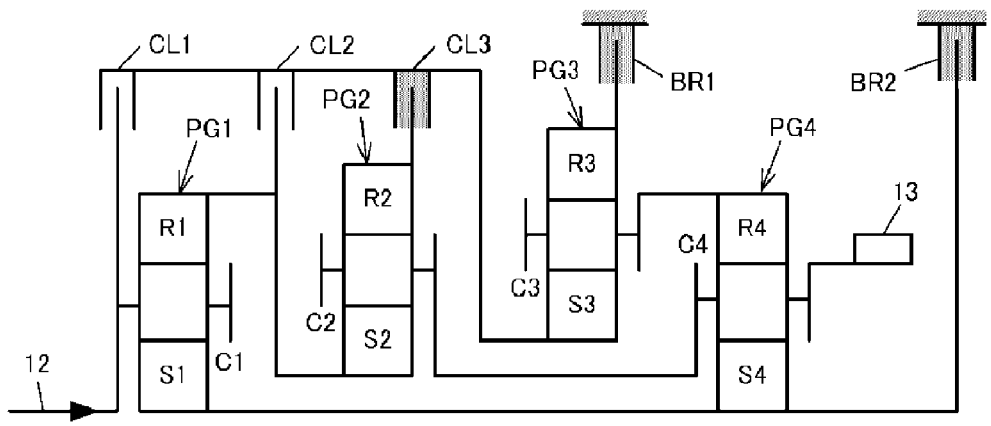
FIG. 11A is a skeleton diagram illustrating the engagement of the frictional coupling elements in a reverse gear.
Figure 11B:
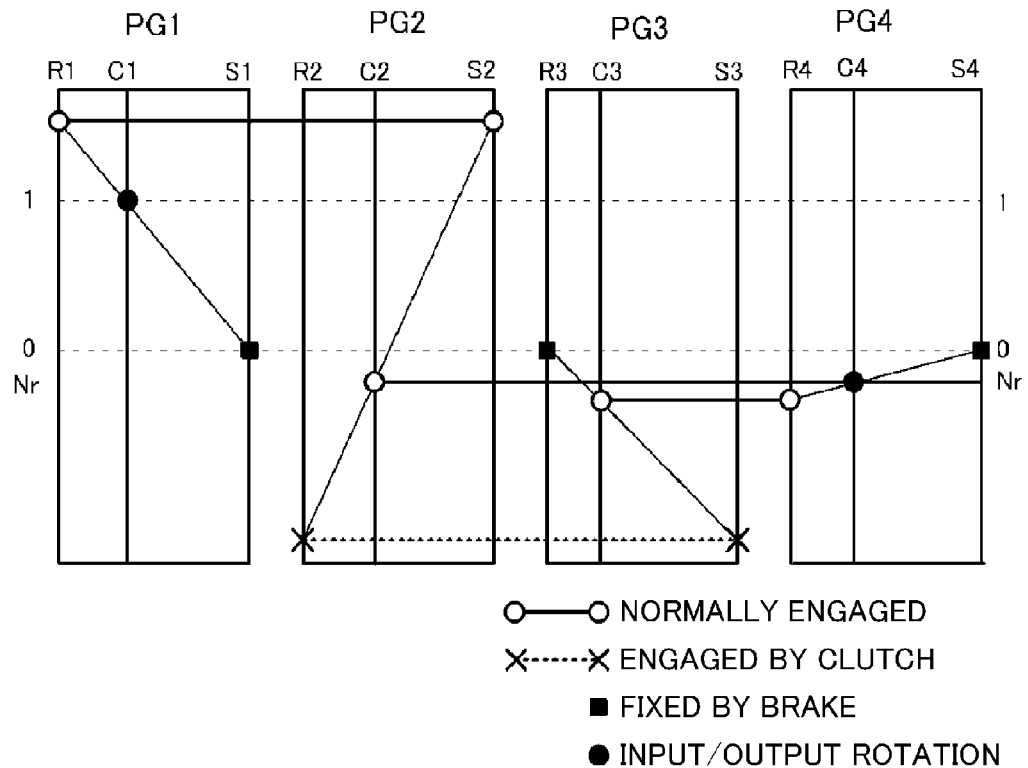
FIG. 11B is a gear ratio diagram of the reverse gear.

In the reverse gear, as shown in FIGS. 11A and 11B, the third clutch CL3, the first brake BR1 and second brake BR2 are engaged. Thus, the rotational speed of the first carrier C1, which is normally engaged with the input shaft 12, is 1, and the rotational speed of the first sun gear S1 is 0. Accordingly, the rotational speed of the first ring gear R1, and the second sun gear S2, which is normally engaged with the first ring gear R1, is determined.

The rotational speed of the fourth carrier C4 is determined on these presuppositions and the following presuppositions: the second ring gear R2 and the third sun gear S3 are engaged to rotate together; the rotational speed of the third ring gear R3 and the fourth sun gear S4 is 0; the second carrier C2 and the fourth carrier C4 are normally engaged; and the third carrier C3 and the fourth ring gear R4 are normally engaged.

The determined rotational speed is an output rotational speed Nr in the reverse gear, where the vehicle travels in the direction opposite to the forward direction.

As described above, the engagement combinations of the frictional coupling elements shown in FIG. 2 make the rotational speeds N1-N8, and Nr satisfy $0<N1<N2<N3<N4<N5<N6<N7<N8$, and $Nr<0$. With the above-described configuration, the output rotational speed N6 of the sixth gear is equal to the input rotational speed (N6=1). Thus, the automatic transmission 10 is provided, which has a gear ratio of 1 in the sixth gear and provides eight forward gears and one reverse gear.

Now, the number of the teeth of the gears of the first to fourth gear sets PG1-PG4 in the automatic transmission 10 are set as shown in, for example, FIG. 12. Then, the gear ratio in each gear stage, and the gear step between each pair of successive forward gears (i.e., the gear ratio in the first gear/the gear ratio in the second gear, the gear ratio in the second gear/the gear ratio in the third gear, the gear ratio in the third gear/the gear ratio in the fourth gear, the gear ratio in the fourth gear/the gear ratio in the fifth gear, the gear ratio in the fifth gear/the gear ratio in the sixth gear, the gear ratio in the sixth gear/the gear ratio in the seventh gear, and the gear ratio in the seventh gear/the gear ratio in the eighth gear) are as shown in FIG. 13. According to the table, the gears having almost even gear steps are obtained.

In the automatic transmission 10 according to this embodiment, the inner rotating member 19A and the outer rotating member 19B are engaged in each of the first to third clutches CL1-CL3. Of these, as described above, the outer rotating members 19B are engaged with the third sun gear S3 and integrated into the single common outer rotating member 14. The end 14a of the single common outer rotating member 14 at the non-power source side is engaged with the third sun gear S3. The common outer rotating member 14 is housed in the transmission case 11 in a non-closed state with no other power transmission member provided closer to the outer periphery. The outer peripheral surface 14b of the common outer rotating member 14 directly faces the inner peripheral surface 11b of the tubular wall 11a of the transmission case 11.

The hydraulic chambers P1-P3 of the first to third clutches CL1-CL3 are arranged closer to the inner periphery than the common outer rotating member 14 is. An oil path in the tubular wall 11a of the transmission case 11 communicates with the oil path in the common outer rotating member 14 through a gap between the outer peripheral surface 14b of the common outer rotating member 14 and the inner peripheral surface 11b of the tubular wall 11a (i.e., between the opposed surfaces of the tubular wall 11a and the common outer rotating member 14). In this manner, the hydraulic oil supply paths a, b, and c supply hydraulic oil from the transmission case 11 to the hydraulic chambers P1-P3, respectively.

Thus, hydraulic oil is directly supplied from the transmission case 11 to each of the hydraulic chambers P1-P3 without passing through an oil path provided for a member other than the constituting members of the associated one of the clutches, for example an oil path provided for a shaft member, which penetrates the inside of one of the planetary gear sets. As a result, unlike a conventional automatic transmission in which each clutch is located in a closed space, there is no need to allow the hydraulic oil supply path to the hydraulic chamber of each clutch to pass through a member such as the shaft member other than the constituting members of the clutch. This shortens and simplifies the hydraulic oil supply paths a, b, and c. This reduces an increase in the size of the automatic transmission 10, and a decrease in response in speed control, etc.

Next, automatic transmission 20-70 according to second to seventh embodiments shown in FIGS. 14-19 will be described.

Like the automatic transmission 10, each of the automatic transmissions 20-70 is mounted in a transverse position in a vehicle, and provides eight forward gears and one reverse gear. Each transmission includes, in a transmission case 11, an input shaft, an output gear, first to fourth gear sets of a single pinion type, and frictional coupling elements (e.g., first to third clutches as well as first and second brakes). The input shaft is engaged with a power source, which is similar to the power source A described in the first embodiment (not shown in FIGS. 14-19). The output gear is arranged coaxially with the input shaft and engaged with a differential mechanism. The gear sets are arranged coaxially with the input shaft. The frictional coupling elements are arranged coaxially with the input shaft. The arrangements of the elements, the engagements of the rotating elements, the engagements and disengagements of the rotating elements by the frictional coupling elements, and the engagements and disengagements of the rotating elements with and from the transmission case by the frictional coupling elements are similar to those in the automatic transmission 10 according to the first embodiment.

The second to seventh embodiments respectively provide the automatic transmission 20-70, each of which has a gear ratio of 1 in the sixth gear and provides eight forward gears and one reverse gear as shown in the engagement logic table of FIG. 2.

The configurations of common outer rotating members 24-74 of first to third clutches CL1-CL3, the arrangements of hydraulic chambers P1-P3, and the configurations of hydraulic oil supply paths a, b, and c are different from those in the automatic transmission 10 according to the first embodiment.

In FIGS. 14-19, the same reference characters as those shown in FIG. 1 are used to represent first to fourth gear sets and rotating elements thereof, as well as frictional coupling elements. In FIGS. 14-19, the reference characters of input shafts are 22, 32, . . . , 72. The reference characters of output gears are 23, 33 . . . , 73. The reference characters of transmission cases are 21, 31 . . . , 71. The reference characters of tubular walls of the respective transmission cases are 21a, 31a, . . . , 71a. The reference characters of the common outer rotating members are 24, 34, . . . , 74.

Figure 14:
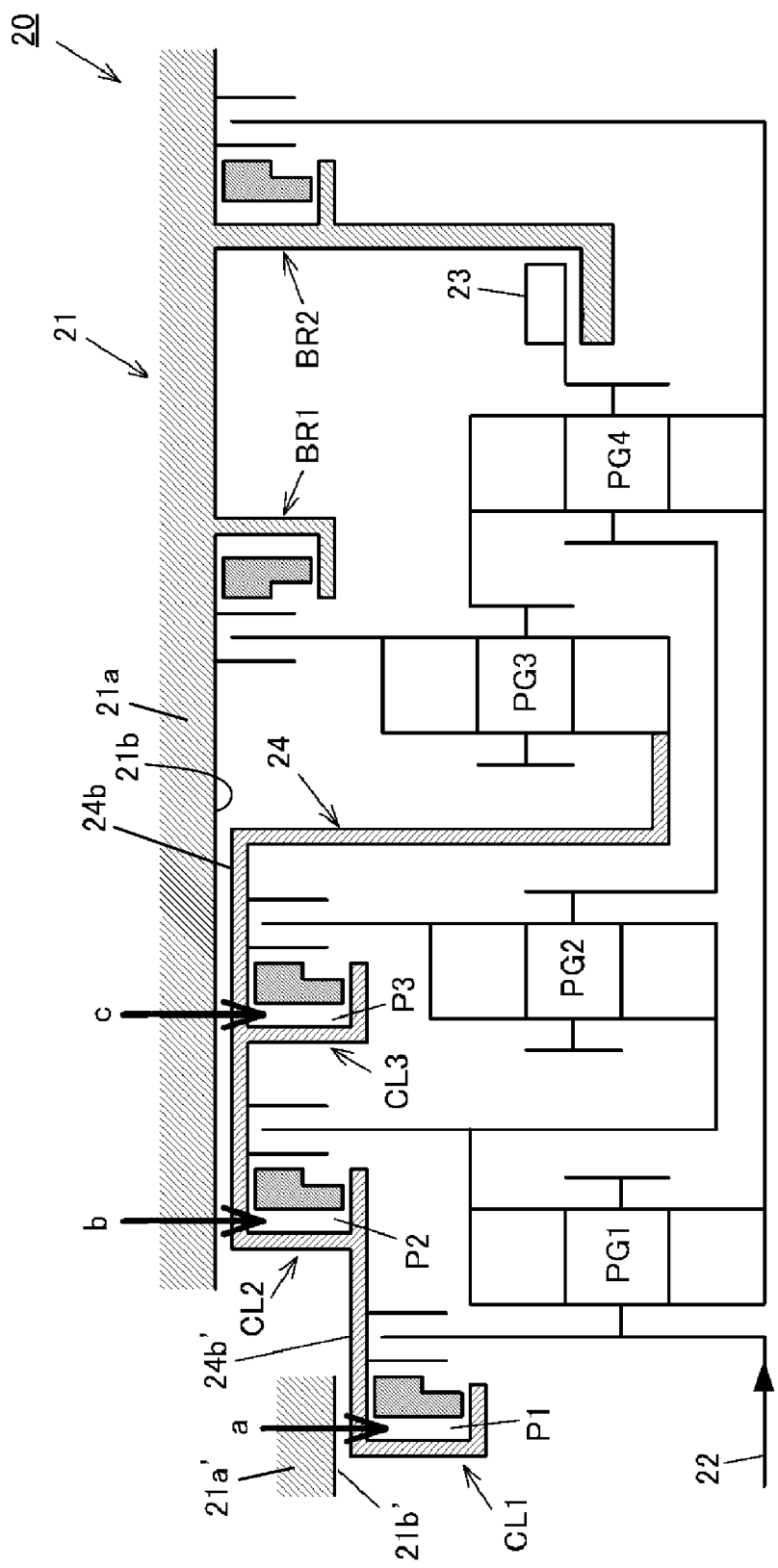
FIG. 14 is a skeleton diagram of an automatic transmission according to a second embodiment.

In the automatic transmission 20 according to the second embodiment shown in FIG. 14, an inner peripheral surface 21b' has a smaller diameter than an inner peripheral surface 21b. The inner peripheral surface 21b' is a surface of a portion 21a' of the tubular wall 21a of the transmission case 21, which faces the first clutch CL1 at the power source side. The inner peripheral surface 21b is a surface of a portion of the tubular wall 21a, which faces the second and third clutches CL2 and CL3. Accordingly, an outer peripheral surface 24b' has a smaller diameter than an outer peripheral surface 24b. The outer peripheral surface 24b' is the surface of a portion of the common outer rotating member 24, which faces the first clutch CL1 at the power source side. The outer peripheral surface 24b is the surface of a portion of the common outer rotating member 24, which faces the second and third clutches CL2 and CL3.

As a result, the hydraulic chamber P1 of the first clutch CL1 is located closer to the inner periphery than the hydraulic chambers P2 and P3 of the second and third clutches CL2 and CL3 are. The outer peripheral surface 24b' of the common outer rotating member 24 and the inner peripheral surface 21*b*' of the tubular wall 21*a*' of the transmission case 21 directly face each other like the outer peripheral surface 24*b* and the inner peripheral surface 21*b*. Accordingly, in the automatic transmission 20 as well, each of the hydraulic oil supply paths a, b, and c leads from the tubular wall 21*a* or 21*a*' of the transmission case 21 to the associated one of the hydraulic chambers P1-P3 through the gap between the inner peripheral surface 21*b* or 21*b*' and the outer peripheral surface 24*b* or 24*b*' of the common outer rotating member 24.

In the automatic transmission 20 as well, hydraulic oil is directly supplied from the transmission case 24 to each of the clutches CL1-CL3 without passing through an oil path provided for a member other than the constituting members of the associated one of the clutches. This shortens and simplifies the hydraulic oil supply paths a, b, and c.

Figure 15:
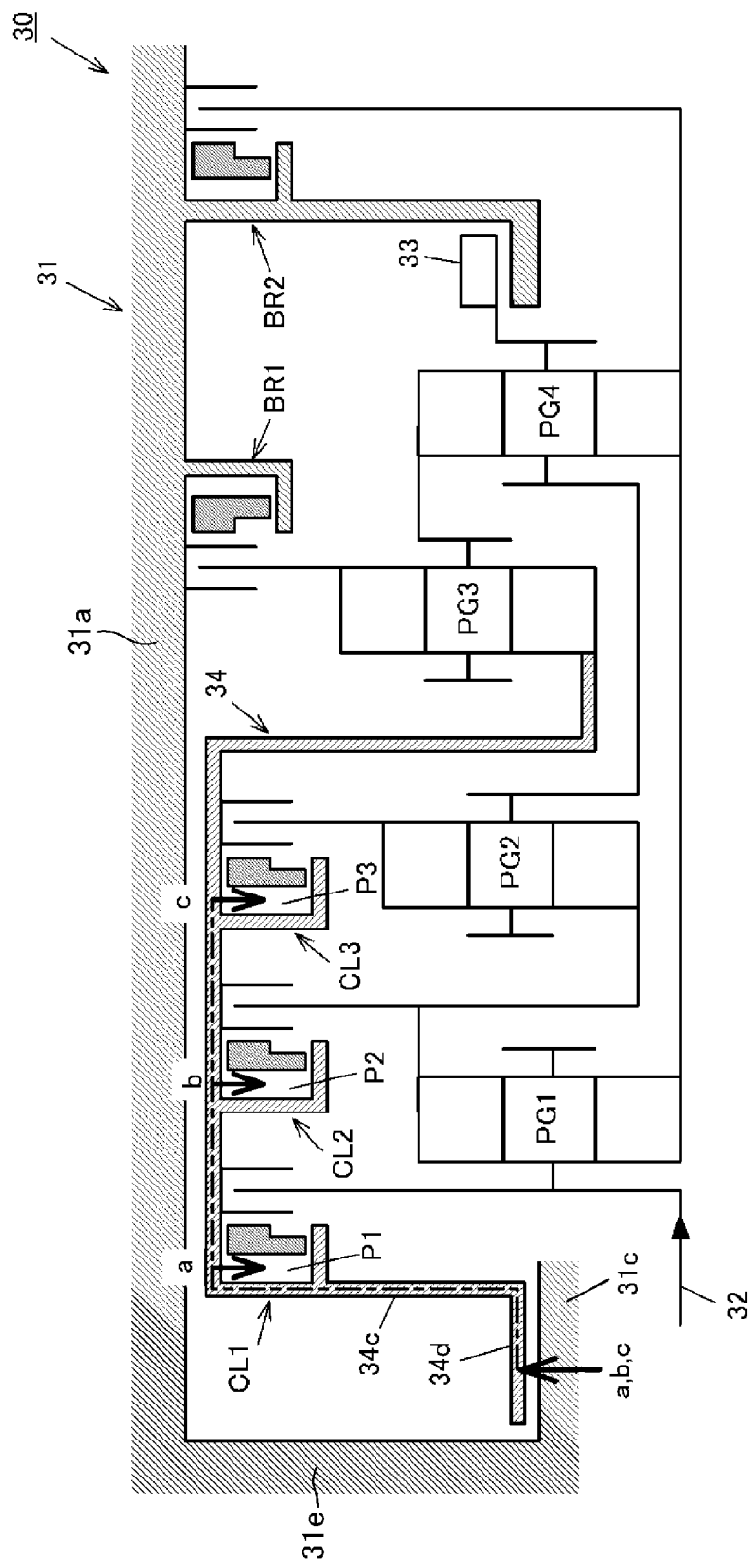
FIG. 15 is a skeleton diagram of an automatic transmission according to a third embodiment.

In the automatic transmission 30 according to the third embodiment shown in FIG. 15, a rotating member-side cylindrical portion 34*d* is provided at the end of the common outer rotating member 34 of the first to third clutches CL1-CL3 at the power source side. The rotating member-side cylindrical portion 34*d* extends toward the power source side via a vertical portion 34*c*, which extends in the transmission radial direction. On the other hand, the transmission case 31 includes a case-side cylindrical portion 31*c* at the end of the transmission case 31 (the tubular wall 31*a*) on the power source side. The case-side cylindrical portion 31*c* extends to the non-power source side in the transmission axis direction from an end wall 31*e*, which extends in the transmission radial direction. The case-side cylindrical portion 31*c* and the rotating member-side cylindrical portion 34*d* are coaxially with the input shaft 32. The rotating member-side cylindrical portion 34*d* is externally fitted in the case-side cylindrical portion 31*c*.

Each of the hydraulic oil supply paths a, b, and c leading from the transmission case 31 to the hydraulic chambers P1-P3 is formed of two oil paths. One of the oil paths runs along the transmission case 31 and leads to the case-side cylindrical portion 31*c* via the end wall 31*e*. The other oil path is located in the common outer rotating member 34 and communicates with the oil path along the transmission case 31 through the gap between the case-side cylindrical portion 31*c* and the rotating member-side cylindrical portion 34*d* (as indicated by the one-dot chain in FIG. 15). The oil paths of the hydraulic oil supply paths a, b, and c in the common outer rotating member 34, which are formed in different circumferential portions of the common outer rotating member 34, communicate with the respective hydraulic chambers P1-P3.

In the automatic transmission 30 according to the third embodiment as well, hydraulic oil is supplied from the transmission case 34 to each of the clutches CL1-CL3 without passing through an oil path provided for a member other than the constituting members of the associated one of the clutches. This shortens and simplifies the hydraulic oil supply paths a, b, and c.

Figure 16:
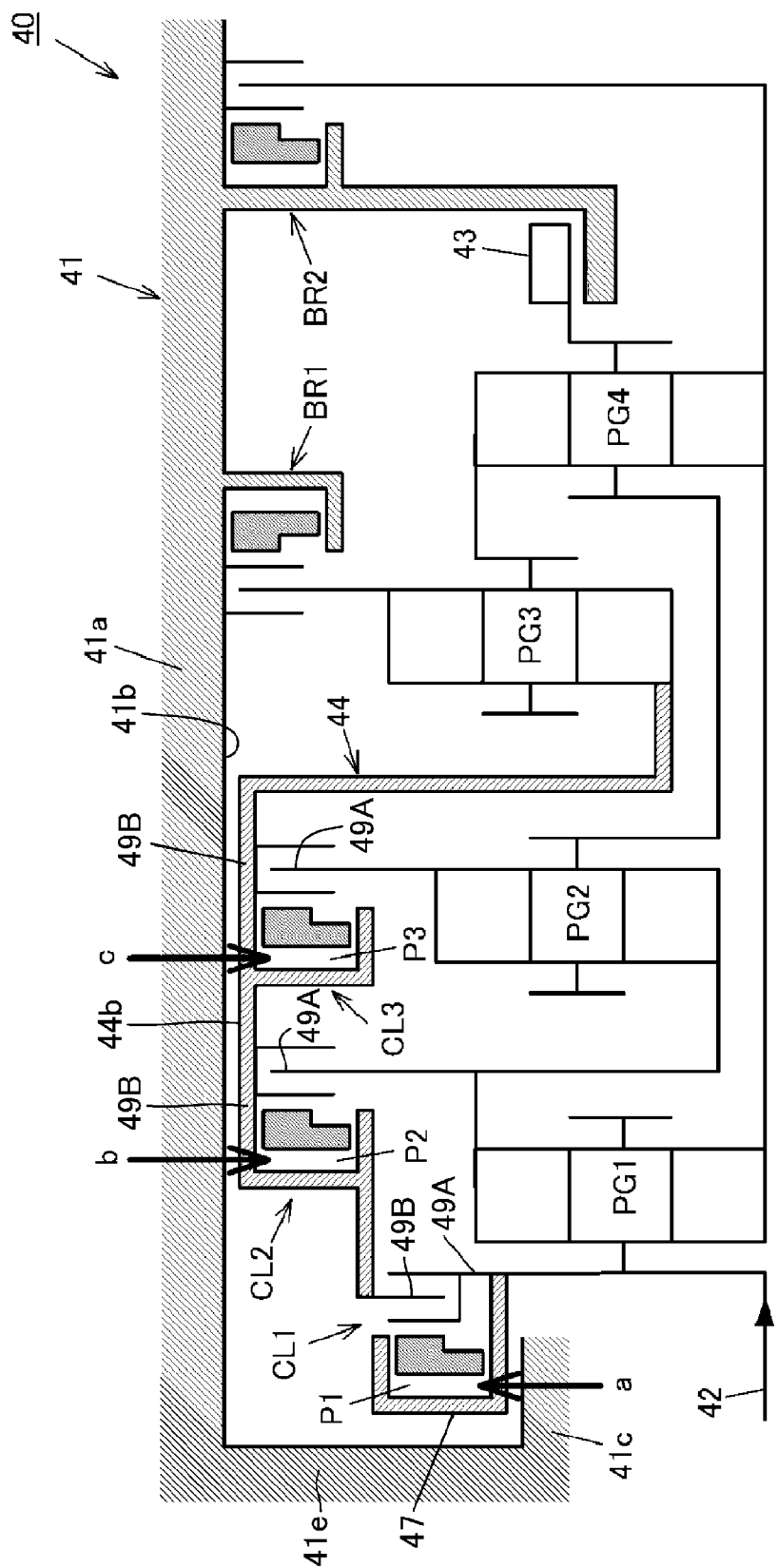
FIG. 16 is a skeleton diagram of an automatic transmission according to a fourth embodiment.

In the automatic transmission 40 according to the fourth embodiment shown in FIG. 16, as in the automatic transmission 20 according to the second embodiment, the hydraulic chamber P1 of the first clutch CL1, which is the closest to the power source side, is arranged closer to the inner periphery than the hydraulic chambers P2 and P3 of the second and third clutches CL2 and CL3 are. A cylinder 47 defining the hydraulic chamber P1 is separated from the common outer rotating member 44, and provided with an inner rotating member 49A of the first clutch CL1. The outer rotating members 49B of the first, second, and third clutches CL1,CL2, and CL3 are integrated into the common outer rotating member 44 shared by the first, second, and third clutches CL1,CL2, and CL3.

The inner peripheral surface of the cylinder 47 is fitted in a boss portion 41*c*, which extends from an end wall 41*e* of the transmission case 41 at the power source side to the non-power source side in the transmission axis direction. The hydraulic oil supply path a extending from the transmission case 41 to the hydraulic chamber P1 is formed by allowing an oil path along the transmission case 41 to communicate with the hydraulic chamber P1 via the interface between the boss portion 41*c* and the cylinder 47 that are fitted to each other.

The hydraulic oil supply paths b and c lead from the transmission case 41 to the hydraulic chambers P2 and P3, respectively. As in the automatic transmissions 10 and 20 according to the first and second embodiments, each of the hydraulic oil supply paths b and c leads from the tubular wall 41*a* of the transmission case 41 to the associated one of the hydraulic chambers P2 and P3 through the gap between the inner peripheral surface 41*b* of the tubular wall 41*a* and the outer peripheral surface 44*b* of the common outer rotating member 44.

In the automatic transmission 40 according to the fourth embodiment as well, hydraulic oil is supplied from the transmission case 41 to each of the clutches CL1-CL3, without passing through an oil path provided for a member other than the consisting members of the associated one of the clutches. This shortens and simplifies the hydraulic oil supply paths a, b, and c. In particular, since hydraulic oil is supplied to the hydraulic chamber P1 from point closer to the inner periphery than the chamber P1, the centrifugal force acting on the hydraulic oil accelerates supply of the hydraulic oil to the hydraulic chamber P1. The speed control is performed with excellent responsiveness when the first clutch CL1 is engaged.

Figure 17:
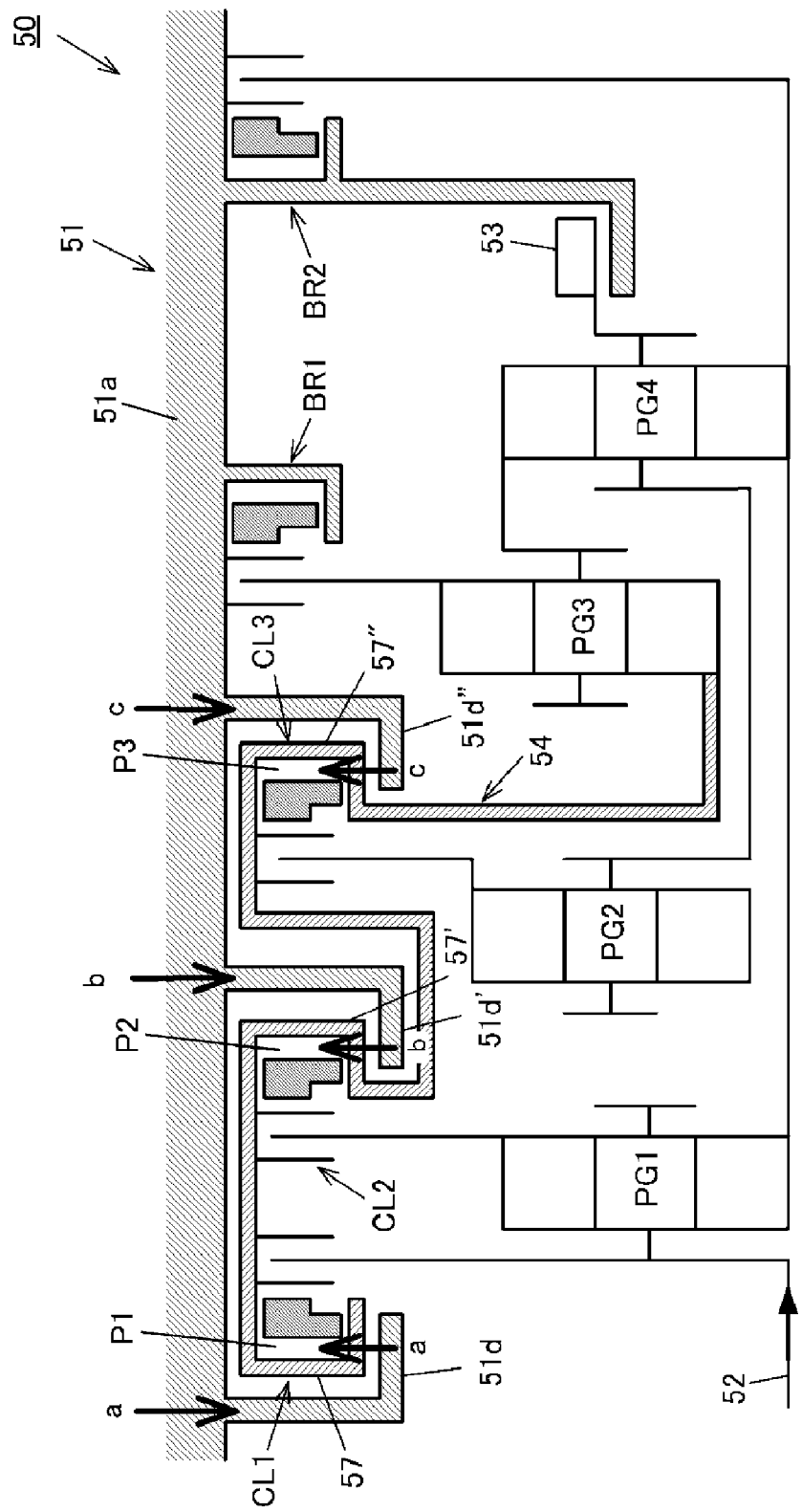
FIG. 17 is a skeleton diagram of an automatic transmission according to a fifth embodiment.

In the automatic transmission 50 according to the fifth embodiment shown in FIG. 17, first, second, and third cylindrical portions 51*d*, 51*d*', and 51*d*" are provided in the inner periphery of the tubular wall 51*a* of the transmission case 51 to face first to the third clutches CL1-CL3, respectively. Each of the cylindrical portions 51*d*, 51*d*', and 51*d*" extends in the transmission axis direction of the automatic transmission 50 via a vertical plane extending in the transmission radial direction. The first cylindrical portion 51*d* extends from the inner peripheral end of the vertical plane to the non-power source side. The second and third cylindrical portions 51*d*' and 51*d*" extend from the inner peripheral end of the vertical plane to the power source side.

The common outer rotating member 54 of the first to third clutches CL1-CL3 includes first, second and third cylinders 57, 57', and 57", which define the hydraulic chambers P1-P3, respectively. The first cylinder 57 expands to the power source side. The second and third cylinders 57' and 57" expand to the non-power source side. The inner peripheral surfaces of inner peripheries of the first, second and third cylinders 57, 57', and 57" are fitted in the outer peripheral surfaces of the first, second, and third cylindrical portions 51*d*, 51*d*', and 51*d*".

An oil path along the transmission case 51 leads to the outer peripheral surface of each of the first, second, and third cylindrical portions 51*d*, 51*d*', and 51*d*" via the vertical plane. These oil paths communicate with oil paths, which are provided for the inner peripheral portions of the first, second, and third cylinders 57, 57', and 57" to communicate with the hydraulic chambers P1-P3 through the gaps between the outer peripheral surfaces of the first, second, and third cylindrical portions 51*d*, 51*d*', and 51*d*" and the inner peripheral surfaces of the inner peripheral portions of the first, second, and third cylinders 57, 57', and 57". Each pair of the communicating oil paths forms one of the hydraulic oil supply paths a, b, and c, which lead from the transmission case 51 to the hydraulic chambers P1-P3, respectively.

In the automatic transmission 50 according to the fifth embodiment as well, hydraulic oil is supplied from the transmission case 51 to each of the clutches CL1-CL3, without passing through an oil path provided for a member other than the consisting members of the associated one of the clutches. This shortens and simplifies the hydraulic oil supply paths a, b, and c. Since hydraulic oil is supplied to the hydraulic chambers P1-P3 from a point closer to the inner periphery, the centrifugal force acting on the hydraulic oil accelerates supply of the hydraulic oil to the hydraulic chambers P1-P3. This results in faster response in speed control.

Figure 18:
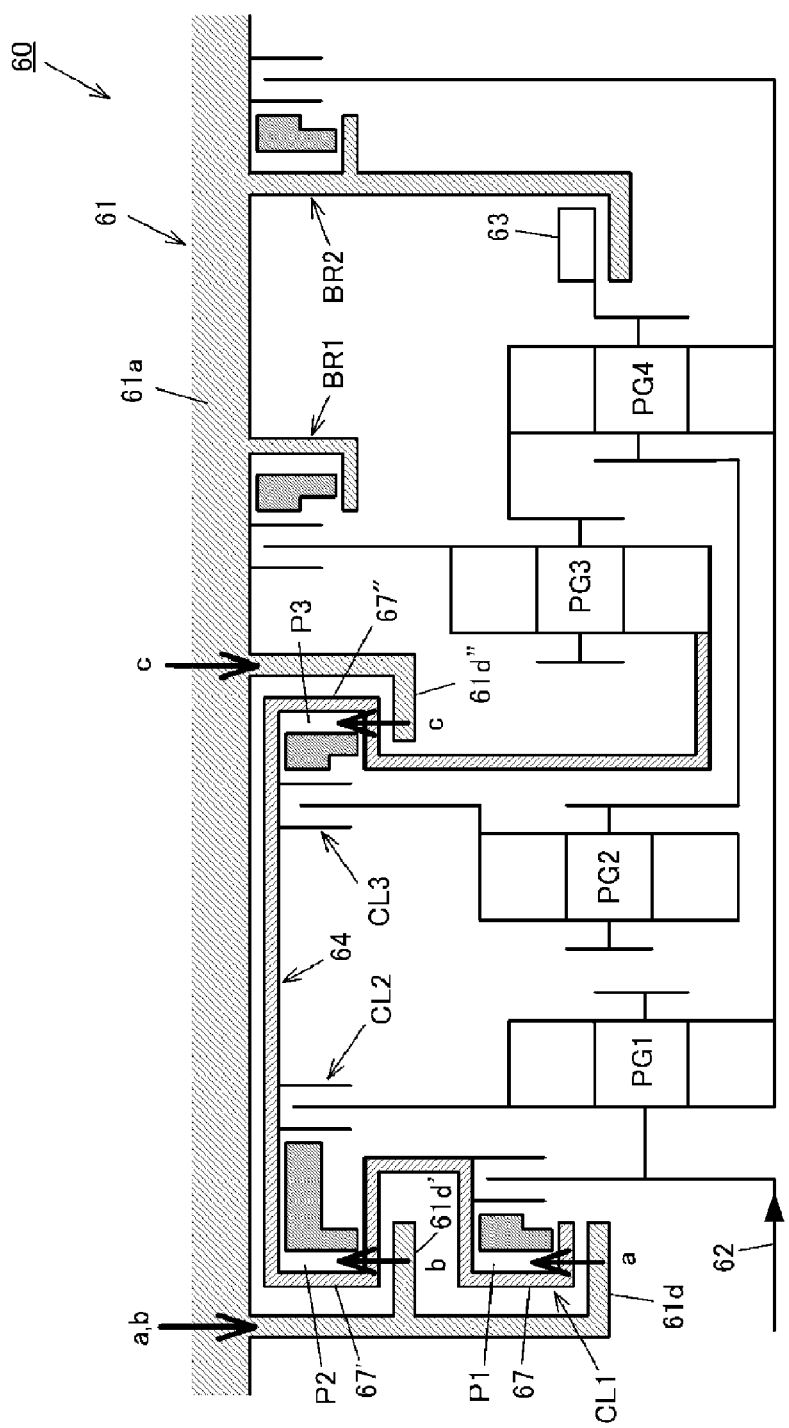
FIG. 18 is a skeleton diagram of an automatic transmission according to a sixth embodiment.

In the automatic transmission 60 according to the sixth embodiment shown in FIG. 18, as in the automatic transmission 50 according to the fifth embodiment, the first, second, and third cylindrical portions 61$d$, 61$d'$, and 61$d''$ are provided closer to the inner periphery than the tubular wall 61$a$ of the transmission case 61 is to face the first to third clutches CL1-CL3. Each of the cylindrical portions 61$d$, 61$d'$, and 61$d''$ extends in the transmission axis direction of the automatic transmission 60 via a vertical plane. In this automatic transmission 60, the first clutch CL1 has a smaller diameter than the second and third clutches CL2 and CL3. The hydraulic chamber P1 defined by the common outer rotating member 64 (a first cylinder 67) is arranged closer to the inner periphery than the hydraulic chamber P2 defined by the common outer rotating member 64 (a second cylinder 67') is.

Accordingly, first and second cylindrical portions 61$d$ and 61$d'$, which are associated with the first and second clutches CL1 and CL2, are provided inside and outside to overlap each other in an almost same position in the transmission axis direction. The cylindrical portions 61$d$ and 61$d'$ extend from the power source, which is the side of the vertical plane, to the non-power source side. First and second cylinders 67 and 67', which define the hydraulic chambers P1 and P2, respectively, are provided inside and outside to overlap each other in an almost same position in the transmission axis direction, and expand to the power source side.

A third cylindrical portion 61$d''$ extends from the non-power source side, which is the side of the vertical plane, to the power source side as in the automatic transmission 50 according to the fifth embodiment. A third cylinder 67" defining the third hydraulic chamber P3 expands to the non-power source side. The inner peripheral surfaces of inner peripheral portions of the first, second, and third cylinders 67, 67', and 67" are fitted in the outer peripheral surfaces of the first, second, and third cylindrical portions 61$d$, 61$d'$, and 61$d''$, respectively.

An oil path along the transmission case 61 leads to the outer peripheral surface of each of the first, second, and third cylindrical portions 61$d$, 61$d'$, and 61$d''$ via the vertical plane. These oil paths communicate with oil paths, which are provided in the inner peripheral portions of the first, second, and third cylinders 67, 67', and 67" to communicate with the hydraulic chambers P1-P3, through the gaps between the outer peripheral surfaces of the first, second, and third cylindrical portions 61$d$, 61$d'$, and 61$d''$ and the inner peripheral surfaces of the inner peripheries of the first, second, and third cylinders 67, 67', and 67". Each pair of the communicating oil paths forms one of the hydraulic oil supply paths a, b, and c, which lead from the transmission case 61 to the hydraulic chambers P1-P3, respectively.

In the automatic transmission 60 according to the sixth embodiment as well, hydraulic oil is supplied from the transmission case 61 to each of the clutches CL1-CL3 without passing through an oil path provided for a member other than the consisting members of the associated one of the clutches. This shortens and simplifies the hydraulic oil supply paths a, b, and c. Since hydraulic oil is supplied to the hydraulic chambers P1-P3 from a point closer to the inner periphery, the centrifugal force acting on the hydraulic oil accelerates supply of the hydraulic oil to the hydraulic chambers P1-P3. This results in faster response in speed control. In addition, since the hydraulic chambers P1 and P2 are provided inside and outside in an almost same position in the transmission axis direction, the automatic transmission 60 requires only a small size in the transmission axis direction.

Figure 19:
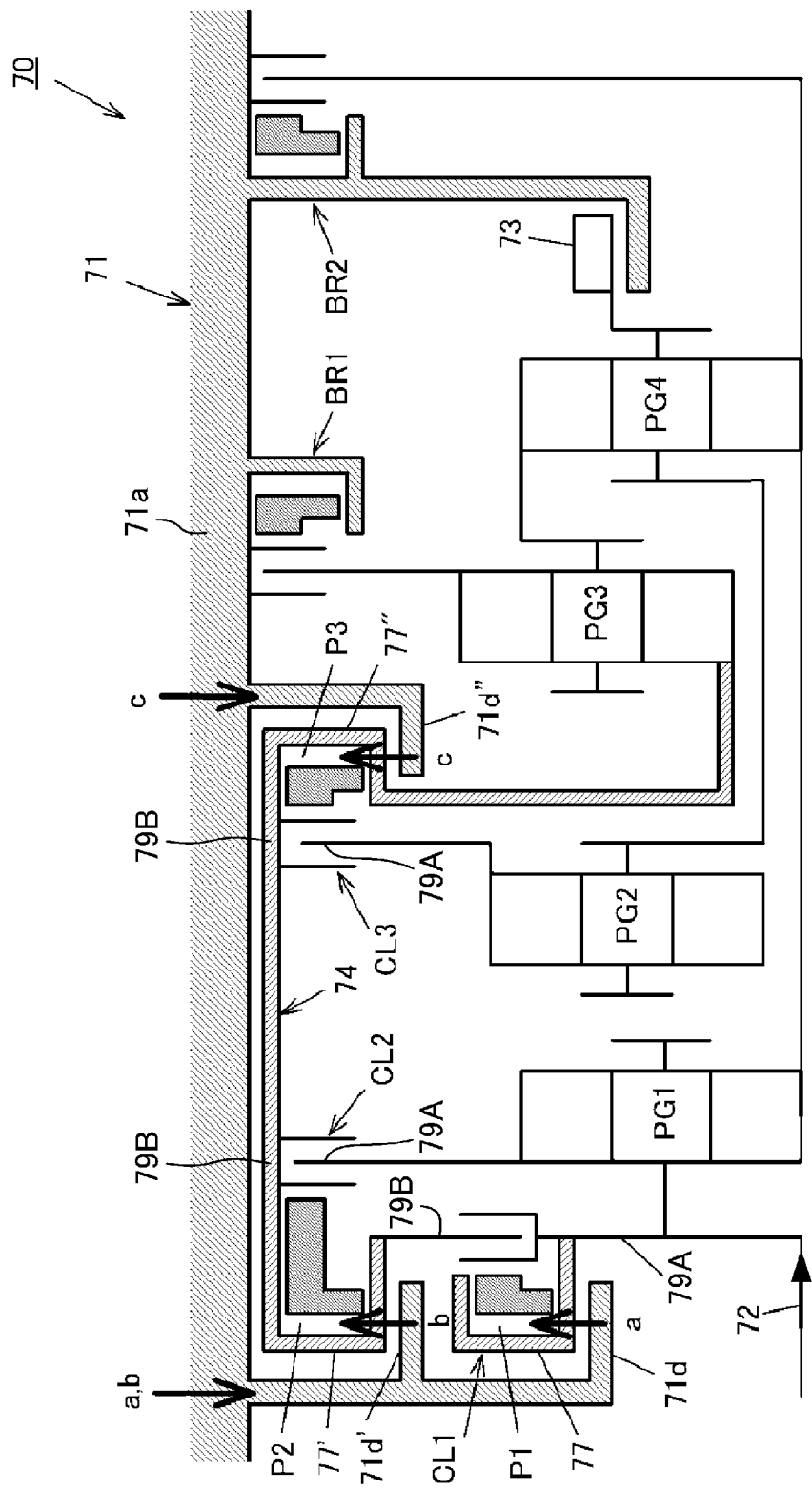
FIG. 19 is a skeleton diagram of an automatic transmission according to a seventh embodiment.
Figure 20:
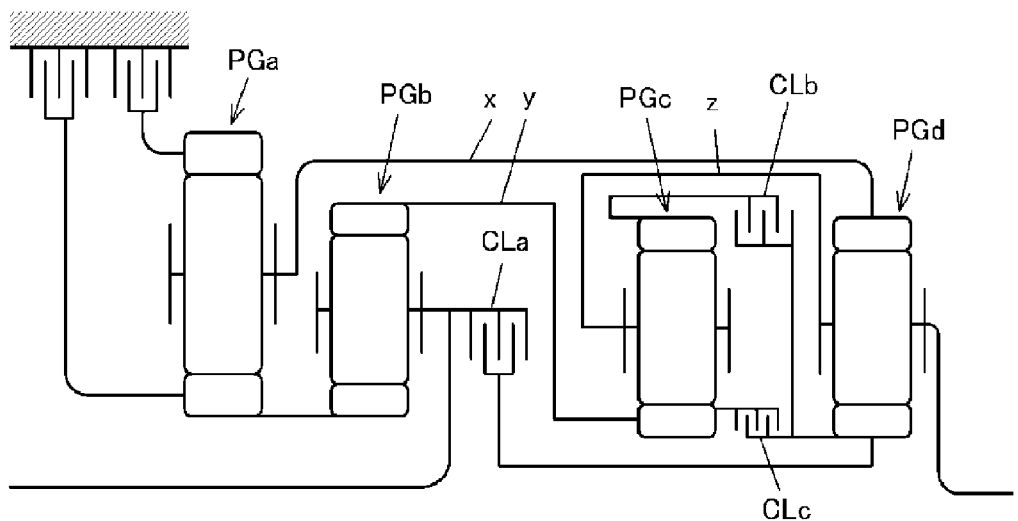
FIG. 20 is a skeleton diagram illustrating a conventional automatic transmission with eight forward gears.

In the automatic transmission 70 according to the seventh embodiment shown in FIG. 19, as in the automatic transmission 60 according to the sixth embodiment, the first clutch CL1 has a smaller diameter than the second and third clutches CL2 and CL3. The hydraulic chamber P1 defined by a first cylinder 77 is located closer to the inner periphery than the hydraulic chamber P2 defined by a second cylinder 77' (the common outer rotating member 74) is.

In this automatic transmission 70, the first cylinder 77 defining the hydraulic chamber P1 is separated from the common outer rotating member 74, and provided with an inner rotating member 79A of the first clutch CL1. The outer rotating members 79B of the first, second, and third clutches CL1,CL2, and CL3 are integrated into the common outer rotating member 74 shared by the first, second, and third clutches CL1,CL2, and CL3.

The other configurations are similar to those in the automatic transmission 60 according to the sixth embodiment. The inner peripheral surfaces of inner peripheries of the first, second, and third cylinders 77, 77', and 77" are fitted in the outer peripheral surfaces of the first, second, and third cylindrical portions 71$d$, 71$d'$, and 71$d''$ extending from the tubular wall 71$a$ of the transmission case 71 via respective vertical plane portions. An oil path along the transmission case 71 leads to the outer peripheral surface of each of the first, second, and third cylindrical portions 71$d$, 71$d'$, and 71$d''$ via the associated one of the vertical planes. These oil paths communicate with oil paths, which are provided in the inner peripheries to communicate with the hydraulic chambers P1-P3, through the gaps between the outer peripheral surfaces of the first, second, and third cylindrical portions 71$d$, 71$d'$, and 71$d''$ and the inner peripheral surfaces of the inner peripheries of the first, second, and third cylinders 77, 77', and 77". Each pair of the communicating oil paths forms one of the hydraulic oil supply paths a, b, and c, which lead from the transmission case 71 to the hydraulic chambers P1-P3, respectively.

In the automatic transmission 70 according to the seventh embodiment as well, hydraulic oil is supplied from the transmission case 71 to each of the clutches CL1-CL3, without passing through an oil path provided for a member other than the consisting members of the associated one of the clutches. This shortens and simplifies the hydraulic oil supply paths a, b, and c. Since hydraulic oil is supplied to the hydraulic chambers P1-P3 from a point closer to the inner periphery, the centrifugal force acting on the hydraulic oil accelerates supply of the hydraulic oil to the hydraulic chambers P1-P3. This results in faster response in speed control. In addition, since the hydraulic chambers P1 and P2 are provided inside and outside in an almost same position in the transmission axis direction, the automatic transmission 70 requires only a small size in the transmission axis direction.

The present invention is not limited to the embodiments described above, and may be modified within the scope of the claims.

The embodiments described above are mere examples and are not intended to be construed as limiting the scope of the present invention. The scope of the present invention is defined by the claims. All variations and modifications of the claims and equivalents fall within the scope of the present invention.

INDUSTRIAL APPLICABILITY

The present invention is useful as an automatic transmission mounted in a vehicle. The automatic transmission simplifies a hydraulic oil supply path from a transmission case to each clutch to reduce an increase in the size of the automatic transmission and a decrease in response in speed control. In these respects, the present invention is highly industrially applicable.

DESCRIPTION OF REFERENCE CHARACTERS 10-70 Automatic Transmission
11-71 Transmission Case
12-72 Input Shaft (Input)
13-73 Output Gear (Output)
14 Common Outer Rotating Member
19A Inner Rotating Members of First to Third Clutches
19B Outer Rotating Members of First to Third Clutches
PG1 First Planetary Gear Set
PG2 Second Planetary Gear Set
PG3 Third Planetary Gear Set
PG4 Fourth Planetary Gear Set
S1 First Sun Gear
S2 Second Sun Gear
S3 Third Sun Gear
S4 Fourth Sun Gear
R1 First Ring Gear
R2 Second Ring Gear
R3 Third Ring Gear
R4 Fourth Ring Gear
C1 First Carrier
C2 Second Carrier
C3 Third Carrier
C4 Fourth Carrier
CL1 First Clutch
CL2 Second Clutch
CL3 Third Clutch
BR1 First Brake
BR2 Second Brake
P1-P3 Hydraulic Chambers of First to Third Clutches
A, B, C Hydraulic Oil Supply Path

The invention claimed is:

1. An automatic transmission mounted in a vehicle, the transmission comprising in a transmission case: an input engaged with a power source;
an output;
a first planetary gear set being of a single pinion type, and including a first sun gear, a first carrier, and a first ring gear;
a second planetary gear set being of the single pinion type, and including a second sun gear, a second carrier, and a second ring gear;
a third planetary gear set being of the single pinion type, and including a third sun gear, a third carrier, and a third ring gear;
a fourth planetary gear set being of the single pinion type, and including a fourth sun gear, a fourth carrier, and a fourth ring gear;
a first clutch;
a second clutch;
a third clutch;
a first brake; and
a second brake, wherein
the input, the output, the planetary gear sets, the clutches, and the brakes are arranged coaxially with each other,
the first, second, third, and fourth planetary gear sets are arranged in sequential order from one axial end to another axial end of the automatic transmission,
the input and the first carrier are engaged,
the first sun gear and the fourth sun gear are engaged,
the first ring gear and the second sun gear are engaged,
the second carrier and the fourth carrier are engaged,
the third carrier and the fourth ring gear are engaged,
the output, the second carrier, and the fourth carrier are engaged,
the first clutch engages and disengages the input and the first carrier with and from the third sun gear,
the second clutch engages and disengages the first ring gear and the second sun gear with and from the third sun gear,
the third clutch engages and disengages the second ring gear with and from the third sun gear,
the first brake engages and disengages the third ring gear with and from the transmission case, and
the second brake engages and disengages the first sun gear and the fourth sun gear with and from the transmission case.

2. The automatic transmission of claim 1, wherein
each of the first, second, and third clutches includes an inner rotating member and an outer rotating member engaged with and disengaged from each other in response to supply and discharge of hydraulic oil,
the outer rotating members of the first, second, and third clutches are integrated into a common outer rotating member shared by the first, second, and third clutches,
an end of the common outer rotating member is engaged with the third sun gear,
the inner rotating member of the first clutch is engaged with the input and the first carrier,
the inner rotating member of the second clutch is engaged with the first ring gear and the second sun gear, and
the inner rotating member of the third clutch is engaged with the second ring gear.

3. The automatic transmission of claim 2, wherein
the transmission case includes a tubular wall, of which an axial center extends along an axis of the automatic transmission,
an outer peripheral surface of the common outer rotating member directly faces an inner peripheral surface of the tubular wall of the transmission case, and
a hydraulic oil supply path leads from the transmission case to each of the first, second, and third clutches through a gap between the inner peripheral surface of the tubular wall and the outer peripheral surface of the common outer rotating member.

4. The automatic transmission of claim 2, wherein
the transmission case includes a case-side cylindrical portion extending from an end wall of the transmission case at the one axial end toward the other axial end,
the common outer rotating member includes a rotating member-side cylindrical portion provided at one end of the common outer rotating member at the one axial end and externally fitted in the case-side cylindrical portion, and
a hydraulic oil supply path leads from the transmission case to each of the first, second, and third clutches through a gap between an outer peripheral surface of the case-side cylindrical portion and an inner peripheral surface of the rotating member-side cylindrical portion.

5. The automatic transmission of claim 2, wherein
a hydraulic oil supply path leads from the transmission case to each of the first, second, and third clutches to introduce the hydraulic oil through an oil path provided for the common outer rotating member to a hydraulic chamber of each of the clutches from a point closer to an inner periphery than the hydraulic chamber is.

6. The automatic transmission of claim 1, wherein
the first clutch, the first brake, and the second brake are engaged to provide a first gear,
the second clutch, the first brake, and the second brake are engaged to provide a second gear,
the first clutch, the second clutch, and the first brake are engaged to provide a third gear,
the second clutch, the third clutch, and the first brake are engaged to provide a fourth gear,
the first clutch, the third clutch, and the first brake are engaged to provide a fifth gear, the first clutch, the second clutch, and the third clutch are engaged to provide a sixth gear,
a gear ratio of the automatic transmission is 1 in the sixth gear,
the first clutch, the third clutch, and the second brake are engaged to provide a seventh gear,
the second clutch, the third clutch, and the second brake are engaged to provide an eighth gear, and
the third clutch, the first brake, and the second brake are engaged to provide a reverse gear.

* * * * *